(12) United States Patent  
Kitamura et al.

(10) Patent No.: US 7,031,064 B2  
(45) Date of Patent: Apr. 18, 2006

(54) METHOD OF MICROLENS ARRAY AND PROJECTION TYPE OF LIQUID CRYSTAL DISPLAY APPARATUS

(75) Inventors: Kazuya Kitamura, Tenri (JP); Yukio Kurata, Tenri (JP); Yoshihiro Sekimoto, Kyoto (JP); Kuniaki Okada, Tenri (JP); Noboru Fujita, Nara (JP); Yukiko Nagasaka, Tenri (JP); Hiroshi Nakanishi, Yawata (JP)

(73) Assignee: Sharp Kabushiki Kaisha, Osaka (JP)

( * ) Notice: Subject to any disclaimer, the term of this patent is extended or adjusted under 35 U.S.C. 154(b) by 18 days.

(21) Appl. No.: 10/672,343

(22) Filed: Sep. 25, 2003

(65) Prior Publication Data

US 2004/0100700 A1    May 27, 2004

(30) Foreign Application Priority Data

Sep. 25, 2002    (JP)    ............................ P2002-279946

(51) Int. Cl.  
   *G02B 27/10*    (2006.01)
(52) U.S. Cl. ...................................... 359/623; 359/622
(58) Field of Classification Search ................ 359/619, 359/621, 622, 623, 626, 625  
See application file for complete search history.

(56) References Cited

U.S. PATENT DOCUMENTS 5,633,737 A    5/1997   Tanaka et al. ............... 349/95

6,773,142 B1 *  8/2004   Rekow ........................ 362/259

FOREIGN PATENT DOCUMENTS

| EP | 0 465 171 B1 | 10/1996 |
| EP | 1 118 883 A2 | 7/2001 |
| JP | 7-181487 | 7/1995 |
| JP | 9-505412 | 5/1997 |
| JP | 9-507588 | 7/1997 |
| JP | 2000-98102 | 4/2000 |
| JP | 2000-321573 | 11/2000 |
| JP | 2001255660 | 9/2001 |
| KR | 2002-0004861 | 1/2002 |

* cited by examiner

*Primary Examiner*—Hung Xuan Dang  
(74) *Attorney, Agent, or Firm*—David G. Conlin; Peter J. Manus; Edwards Angell Palmer & Dodge LLP

(57) ABSTRACT

An object of the invention is to provide a method of manufacturing a microlens array and a projection-type liquid crystal display apparatus which can increase the efficiency of use of light, facilitate a method of manufacturing a microlens array and reduce the cost of equipment. By an operation of only irradiating a first lens with parallel light which has an intensity distribution corresponding to the shape of a second lens and irradiating an ultraviolet curing resin layer with transmission light, the first and second lenses are placed with a high alignment accuracy in a mutual positional relation thereof. By irradiating the first lens with the parallel light, it becomes possible to uniformly expose a broad area, and it becomes possible to expose by the wafer.

2 Claims, 17 Drawing Sheets

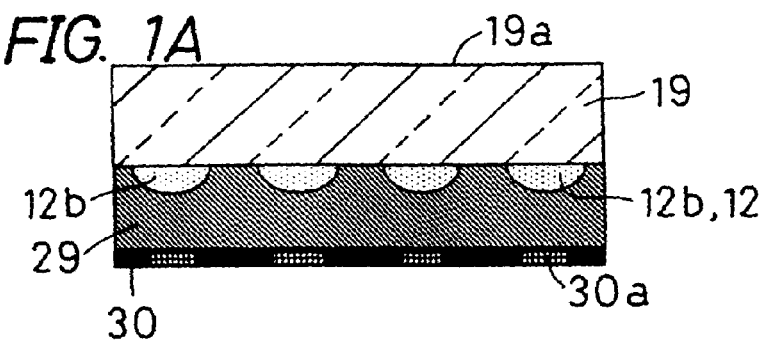
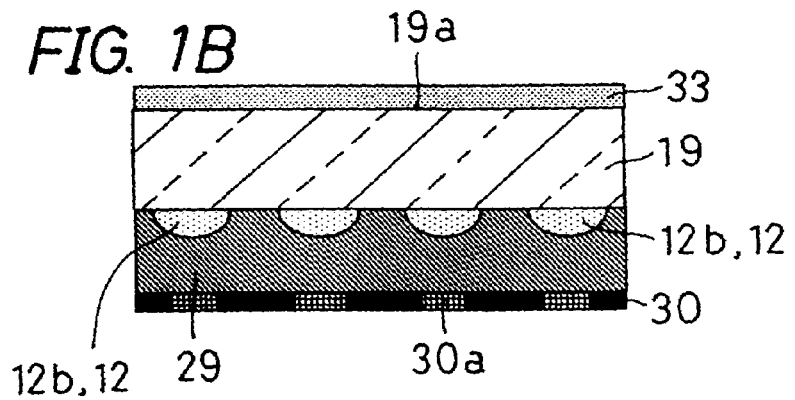
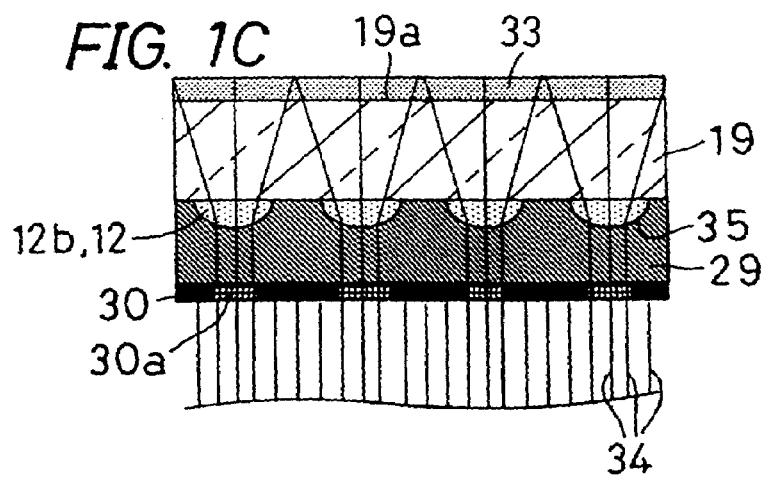
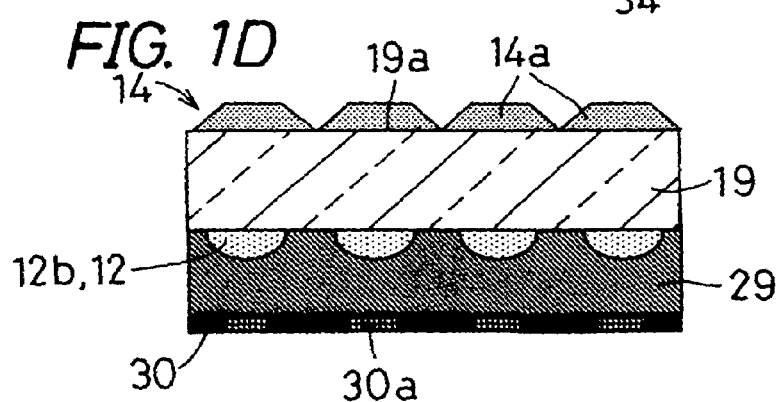

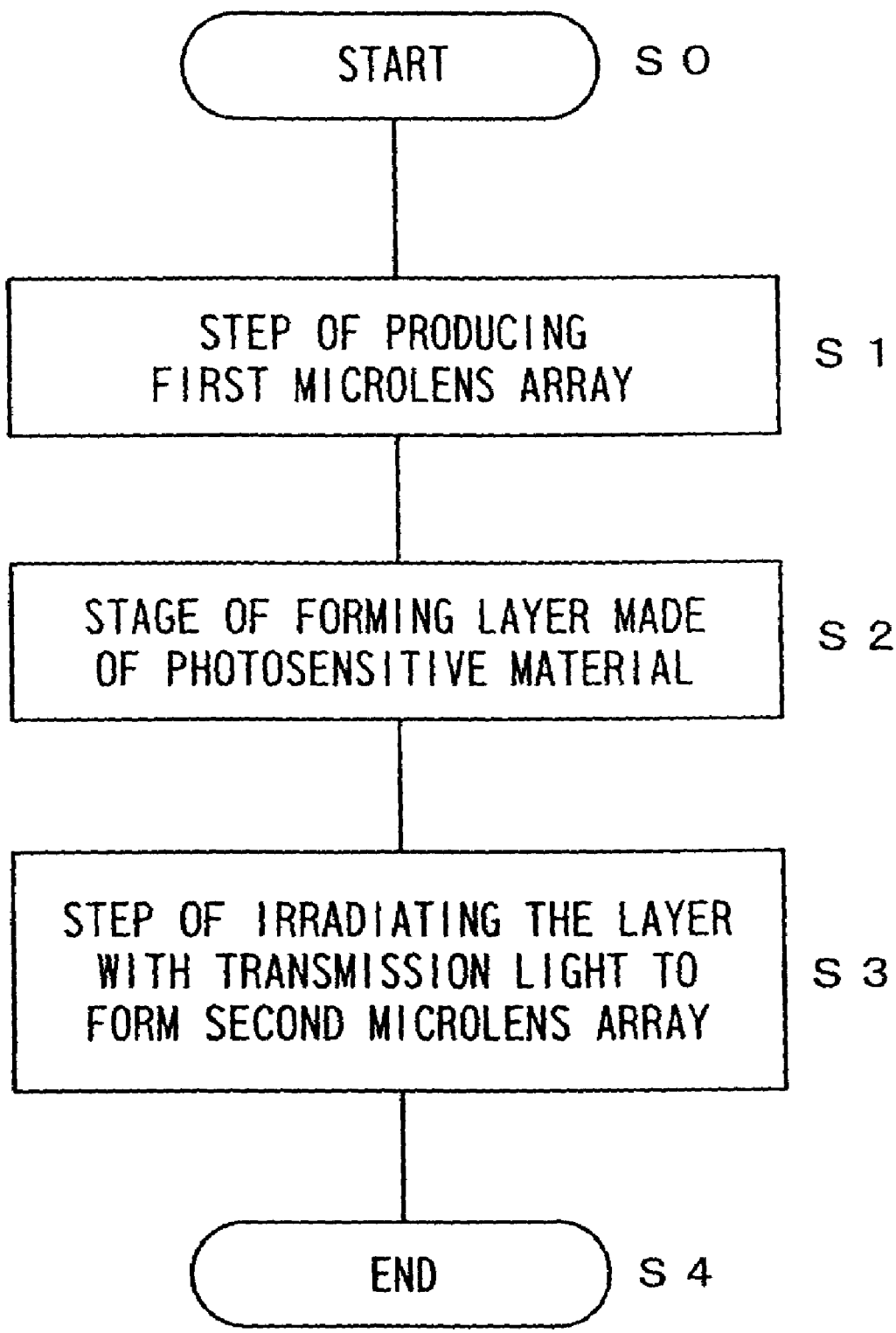

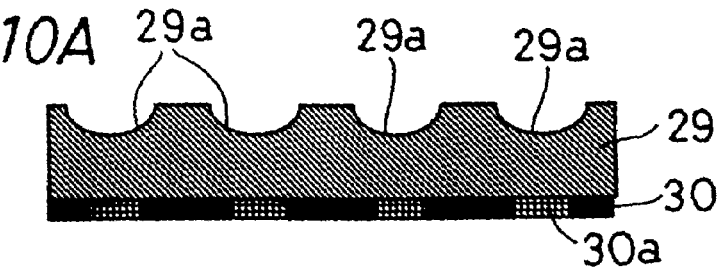
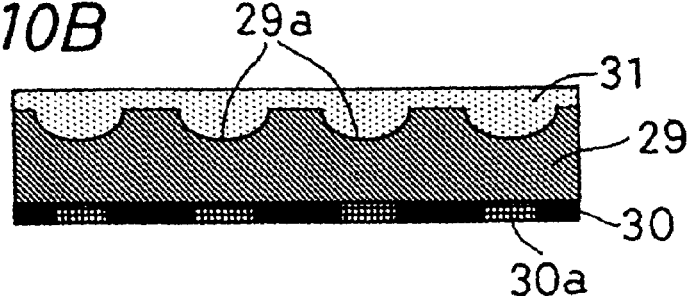
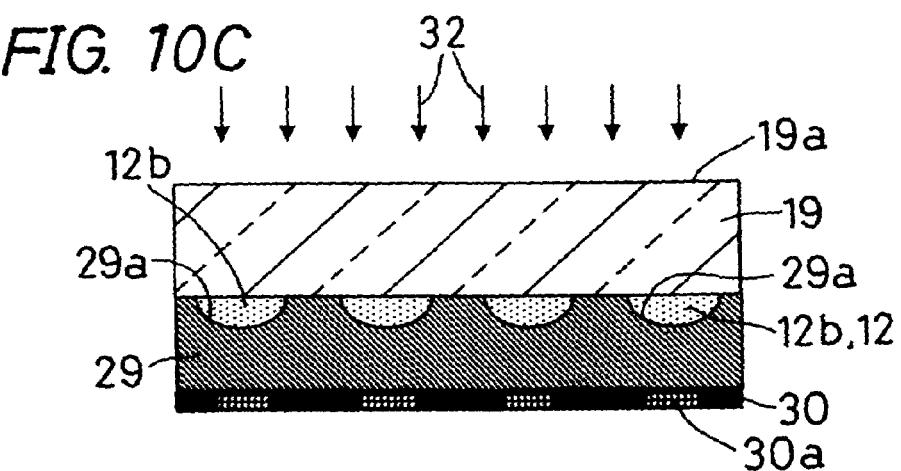
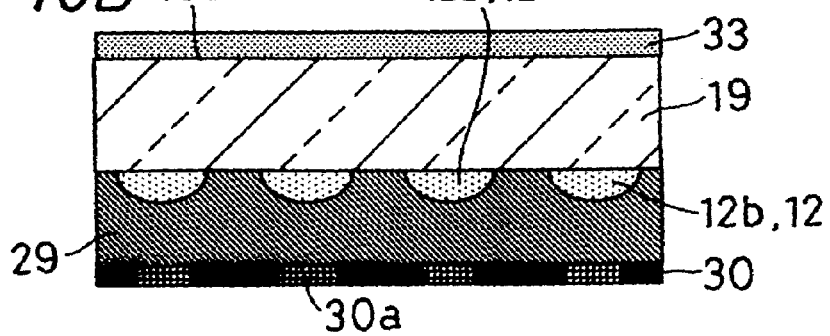

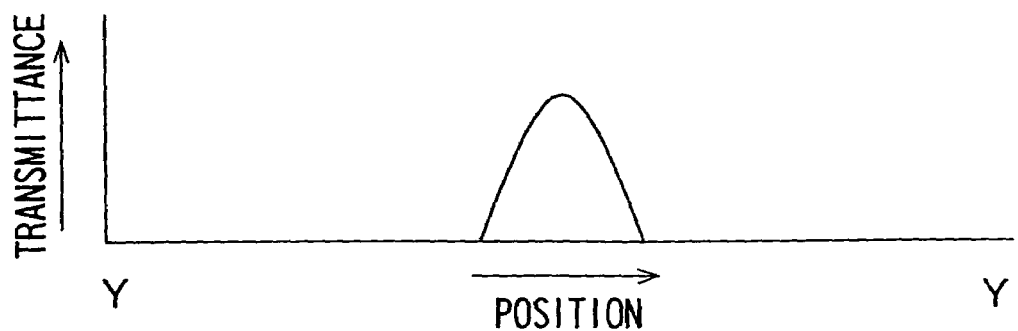
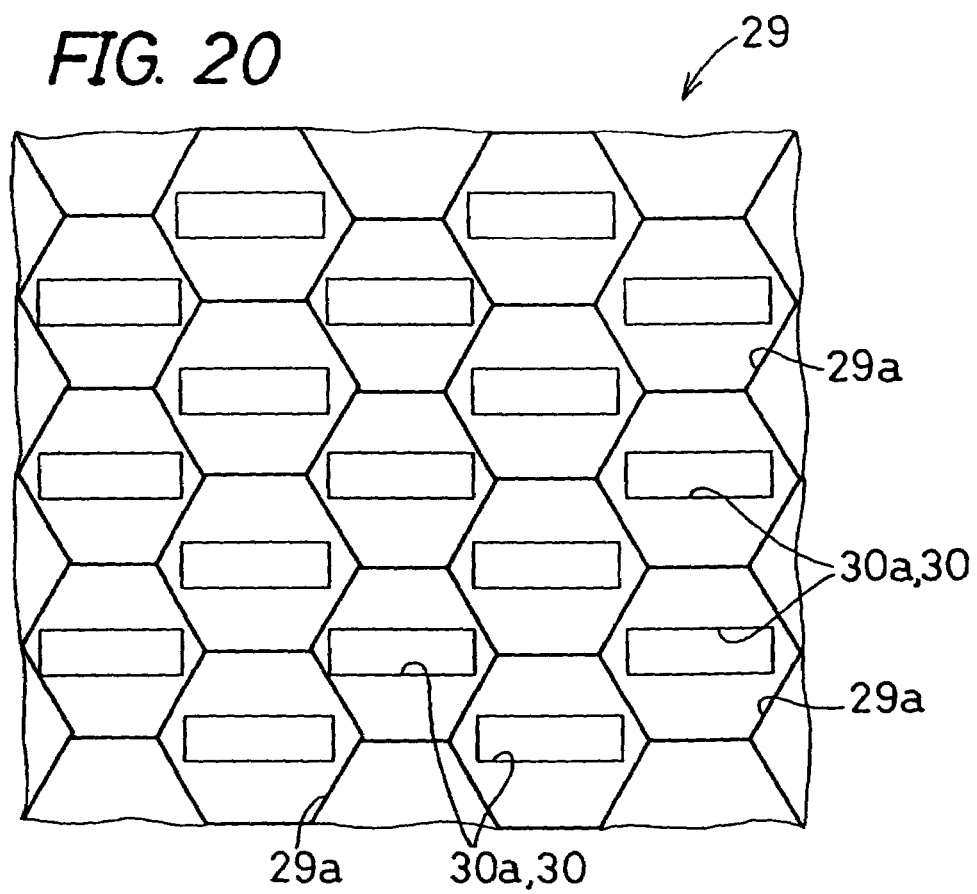

METHOD OF MICROLENS ARRAY AND PROJECTION TYPE OF LIQUID CRYSTAL DISPLAY APPARATUS

BACKGROUND OF THE INVENTION

1. Field of the Invention

The present invention relates to a method of manufacturing a microlens array and a projection type of liquid crystal display apparatus, and relates to a technology which is applied to, for example, an image projecting device including a liquid crystal panel and so on.

In the invention, a term of 'a cylindrical shape' is a synonymous with a partially cylindrical shape.

2. Description of the Related Art

Liquid crystal display apparatuses are generally classified into a direct-view type and a projection type.

For example, in a liquid crystal projector or the like, one of a projection type which projects the content of a display cell on a screen by the use of a lens, the projection-type one facilitating large screen display, is used. As compared with a projection type of cathode ray tube display apparatus, this projection type of liquid crystal display apparatus has a broad color reproduction range, and is small and lightweight, and therefore, it is excellent in portability. Because an optical system of a projection type of liquid crystal display apparatus is not influenced by geomagnetism, a convergence adjustment, that is, a color deviation-correction is unnecessary in a projection type of liquid crystal display apparatus. Because a projection type of liquid crystal display apparatus is provided with the aforementioned features and made to be a large screen more easily than one of a direct-view type, it is thought to become major in household image display apparatuses.

Projection-type color image display systems using liquid crystal display elements are divided to a three-panel system using three liquid crystal display elements corresponding to the three primary colors and a single-panel system using one liquid crystal display element. In the structure of a three-panel system of image display system, an optical system which divides white light into the three primary colors of red, green and blue and three liquid crystal display elements which control light fluxes of the respective colors and form images are disposed independently from each other, and images of the respective colors are optically superimposed and displayed in full colors.

In the structure of a single-panel system of image display system, a color filter of the three primary colors is placed in each pixel, and a color image is projected by one liquid crystal display element. Since this single-panel system uses only one liquid crystal display element and the structure of an optical system is simple as compared with that of the three-panel system, it is possible to reduce the component count of a projection type of liquid crystal display apparatus and decrease the cost of manufacturing, and moreover, it becomes possible to downsize.

A projection type of liquid crystal display apparatus equipped with a single-panel system of liquid crystal display element, the projection type of liquid crystal display apparatus having no color filter, which is so-called color-filterless (refer to Japanese Unexamined Patent Publication JP-A 7-181487 (1995), page 7, FIG. 1), for example), is disclosed. In the liquid crystal display element, a first microlens array is bonded on one end face on a light-entering side of a board. On the other end face on a light-exiting side of the board, a second microlens array is bonded.

By three dichroic mirrors which are not shown in the drawings, white light from a white light source is divided into respective colors of red R, green G and blue B. Light fluxes of the respective divided colors are converged in the vicinity of a light-exiting position of the second microlens array by the first microlens array. The second microlens array parallelizes chief rays of the plural entering light fluxes and makes them exit from the liquid crystal display element. The first and second microlens arrays are manufactured, respectively, by the use of a thermal sagging method, an ion exchange method, a thermal transfer method, a machining method or the like, and by bonding the manufactured first and second microlens arrays to the board while aligning the optical axes thereof, a two-layer microlens array is manufactured.

Various manufacturing methods of manufacturing two-layer microlens arrays are proposed (refer to Japanese Unexamined Patent Publication JP-A 2000-98102 (2000), page 8, FIGS. 13–16, for example). In a manufacturing method disclosed in the Japanese Unexamined Patent Publication JP-A 2000-9810.2 (2000), page 8, FIGS. 13–16, a two-layer microlens array is molded by a so-called 2P (2P: photo polymerization) method using an ultraviolet curing resin that is cured by irradiation of an ultraviolet ray. In specific, a vertically driving mechanism that is capable of vertically driving is disposed to a board that is supported by a table.

In a state that a stamper is adhesively supported by this vertically driving mechanism, an ultraviolet curing resin is supplied between the stamper and the board, the vertically driving mechanism is driven, and the supplied ultraviolet curing resin is molded into a desired shape by the stamper. After that, the ultraviolet curing resin is cured by irradiation of an ultraviolet ray, and the stamper is released by the vertically driving mechanism. By repeatedly executing the operation of supplying the resin, molding by the use of the vertically driving mechanism and the stamper, curing with an ultraviolet ray and releasing the stamper, a two-layer microlens array is molded between two boards.

In the related art of the three-panel system described above, it is possible to effectively use light emitted from a white light source and the purity of color is high, whereas since a color separating system and a color synthesizing system are necessary, an optical system is complicated and the component count increases. Therefore, in the case of this projection type of liquid crystal display apparatus, not only the cost of manufacturing is high, but also a manufacturing method is complicated.

In the related art of the single-panel system using a color filter, it is possible to decrease the cost of manufacturing and downsize as compared with the related art of the three-panel system, whereas since light is absorbed or reflected by the color filter, for example, only approximately one third of incident light can be used. Therefore, the efficiency of use of light is bad, and a display screen is dark.

In the related art disclosed in JP-A 7-181487, it is possible to make a display screen brighter by disposing the second microlens array, whereas when bonding the first and second microlens arrays to the board, it is required to align them so that the centers of a plurality of lenses of a minute lens pattern of the first microlens array match with the corresponding centers of a plurality of lenses of the second microlens array. Because this alignment of the first and second microlens arrays is difficult and a highly accurate aligning device and a bonding device are necessary, the cost of equipment is high.

In the related art disclosed in JP-A 2000-98102, the stamper is moved plural times by the vertically driving mechanism to produce the first and second microlenses. The vertically driving mechanism has, for example, a direct acting bearing whose straightness is high, and the accuracy of alignment of the first and second microlenses is substantially determined by the straightness of the direct acting bearing. However, even when the direct acting bearing with high straightness as described above is adopted, it is difficult to restrict the alignment accuracy within 10% of a pixel pitch, which is a necessary specification. In a case where the alignment accuracy of the first and second microlenses deviates from a necessary stipulated value, not only the efficiency of use of light decreases markedly, but also a light flux undesirably enters into an adjacent pixel. As a result, so-called color mixture is caused, and the quality of an image is lowered significantly.

Moreover, in order to minimize a deviation of the first and second microlenses, it is necessary to mold the second microlens in the state of supporting the board and the stamper to the device after molding the first microlens. As a result, the shape of the first microlens and the shape of the second microlens become the same shapes inevitably. Therefore, freedom of design is considerably restricted, and it is impossible to realize a two-layer microlens array that enables acquirement of optimum efficiency of use of light. Since freedom of design is thus restricted considerably, it is impossible to manufacture the two-layer microlens array disclosed in JP-A 7-181487 by using the related art Further, in the related art disclosed in JP-A 2000-98102, page 8, FIGS. 13–16, it is necessary to increase refraction indices in the order of the first microlens, the second microlens and the board. However, since the width of the refraction index of a UV (ultraviolet) resin has a limitation, a sufficient difference of refraction indices cannot be obtained on lens faces, and a lens with a short focal length cannot be produced.

Furthermore, in the 2P method or an injection molding method, it is difficult to form a vertical wall between adjacent microlenses. Even when the vertical wall can be formed by the use of the 2P method or the injection molding method, there is a problem that the vertical wall, that is, the microlenses themselves are broken at the time of mold release.

SUMMARY OF THE INVENTION

Hence, an object of the present invention is to provide a method of manufacturing a microlens array and a projection type of liquid crystal display apparatus which enable increase of the efficiency of use of light and facilitation of a method of manufacturing a microlens array to decrease the cost of equipment.

The invention provides a method for manufacturing a microlens array comprising:

a first step of producing a first microlens array;

a second step of forming a layer made of a photosensitive material; and a third step of forming a second microlens array by irradiating the first microlens array with parallel light that has an intensity distribution responsive to a shape of the second microlens array and irradiating the layer made of the photosensitive material with transmission light that is transmitted by the first microlens array.

According to the invention, the first microlens array is produced at the first step, and a layer made of a photosensitive material is formed at the second step. Then, at the third step, the first microlens array is irradiated with parallel light that has an intensity distribution responsive to a shape of the second microlens array. The layer made of a photosensitive material formed at the second step is irradiated with transmission light that is transmitted by the first microlens array. Consequently, the second microlens array is formed.

In this manner, by an operation of just irradiating the first microlens array with parallel light that has an intensity distribution responsive to a shape of the second microlens array and irradiating the layer made of a photosensitive material with transmission light, the first and second microlens arrays are placed with high alignment accuracy in a mutual positional relation. Therefore, it is possible to increase optical characteristics of the first and second microlens arrays, and it is possible to prevent decrease of yield due to generation of a defective product. Besides, a need to align the first microlens array and the second microlens array by a mechanical operation every time when manufacturing one microlens array is eliminated, and it is possible to shorten tact time. Moreover, a highly accurate aligning device and a bonding device are unnecessary, and it is possible to decrease the cost of equipment.

In specific, by irradiating the first microlens array with the parallel light, exposure across a broad area is enabled, and exposure by the wafer is enabled.

Further, in the invention it is preferable that the photosensitive material is a photosensitive resin and the second microlens array is formed by irradiating and exposing the layer made of this photosensitive resin to the transmission light.

According to the invention, by irradiating and exposing the layer made of a photosensitive resin to the transmission light at the third step, it is possible to form the second microlens array.

Still further, in the invention it is preferable that by causing a mask member which has a preset light transmittance distribution to transmit the parallel light, the intensity distribution is given.

According to the invention, by causing a mask member that has a preset light transmittance distribution to transmit the parallel light, an intensity distribution responsive to a shape of the second microlens array is given, and it is possible to realize a desired shape of the second microlens array.

Still further, in the invention it is preferable that:

at the first step, the first microlens array is produced by the use of a stamper mold which has a shape responsive to a shape of the first microlens array;

after the second step, at the third step, the first microlens array is irradiated with the parallel light that has an intensity distribution responsive to a shape of the second microlens array, via a mask member which is formed into one piece with the stamper mold; and the layer made of a photosensitive material is irradiated with the transmission light transmitted by the first microlens array, whereby the second microlens array is formed.

According to the invention, at the first step, the first microlens array is produced by the use of a stamper mold. After that, the first microlens array is irradiated with the parallel light that has an intensity distribution responsive to a shape of the second microlens array, via the mask member formed into one piece with the stamper mold. The layer made of a photosensitive material is irradiated with the transmission light transmitted by the first microlens array, whereby the second microlens array can be formed.

Still further, in the invention it is preferable that the mask member is formed by applying a material which changes transmittance of light of a specific wavelength to a light-transmitting board.

According to the invention, the mask member is formed by applying a material that changes transmittance of light of a specific wavelength to a light-transmitting board. By the use of this mask member, the second microlens array can be formed.

Still further, in the invention it is preferable that after the first microlens array is produced by the use of the stamper mold at the first step, the second microlens array is formed as the first microlens array and the stamper mold are kept in one piece.

According to the invention, at the first step, the first microlens array is produced by the use of the stamper mold. After that, the second microlens array is formed as the first microlens array and the stamper mold are kept in one piece. As described above, it is possible to form the second microlens array while keeping the first microlens array and the stamper mold in one piece, that is, without releasing the stamper mold from the first microlens array, so that it is possible to stably ensure high alignment accuracy of the first microlens array and the second microlens array.

Still further, the invention provides a microlens array comprising:

a first microlens array disposed to one end face in a thickness direction; and a second microlens array disposed to another end face in the thickness direction and formed into a cylindrical shape.

According to the invention, the second microlens array disposed to the other end face in the thickness direction is formed into a cylindrical shape, so that it is possible to avoid scattering of light. The scattering of light is caused resulting from light entering into an undesired position of the second microlens array. Therefore, it is possible to increase an optical characteristic of a microlens array.

Still further, the invention provides a microlens array comprising:

a first microlens array disposed to one end face in a thickness direction thereof; and a second microlens array disposed to another end face in the thickness direction and formed into an aspheric shape.

According to the invention, the second microlens array disposed to the other end face in the thickness direction is formed into an aspheric shape, so that it is possible to suppress an aberration which is possibly caused by the second microlens array. Therefore, it is possible to further increase the efficiency of use of light.

Still further, the invention provides a microlens array manufactured by the methods of manufacturing microlens arrays.

According to the invention, the microlens array can be easily manufactured by the methods of manufacturing microlens arrays described before. Moreover, without using a highly accurate aligning device and a bonding device, the first and second microlens arrays are placed with high alignment accuracy in the mutual positional relation. Therefore, it is possible to facilitate a method of manufacturing a microlens array while ensuring the high alignment accuracy, and reduce the cost of facility.

Still further, the invention provides a projection-type liquid crystal display apparatus comprising:

a liquid crystal display element; and the microlens array that causes light from a light source to converge to a pixel position of the liquid crystal display element.

According to the invention, it is possible to easily realize a projection type of liquid crystal display apparatus that comprises a liquid crystal display element and the microlens array that causes light from a light source to converge.

Still further, the invention further comprises:

a light source; and light flux separating means for separating a white light flux from the light source into a plurality of light fluxes, wherein the liquid crystal display element transmits the plural light fluxes separated by the light flux separating means, and selectively changes intensity distributions of these light fluxes.

According to the invention, it is possible to easily realize a projection type of liquid crystal display apparatus that comprises a light source, light flux separating means which separates a white light flux from this light source into a plurality of light fluxes, a liquid crystal display element, and the microlens array. The white light flux emitted from the light source is separated into a plurality of light fluxes by the light flux separating means. By causing these separated light fluxes to pass through the liquid crystal display element, selectively changing intensity distributions of these light fluxes, and projecting, it is possible to display on a screen.

Still further, the invention provides an apparatus for manufacturing a microlens array, comprising:

a stamper mold for forming a first microlens array, the stamper mold having a shape responsive to a shape of the first microlens array; and a mask member for forming a second microlens array, the mask member having a preset light transmittance distribution, the stamper mold and the mask member being formed into one piece.

According to the invention, it is possible to form the first microlens array by the use of the stamper mold having a shape responsive to a shape of the first microlens array. Moreover, it is possible to form the second microlens array by the use of the mask member having a preset light transmittance distribution. The stamper mold and the mask member are formed into one piece, and it is possible to form the first and second microlens arrays while keeping them in one piece, that is, without releasing the stamper mold. Therefore, it is possible to stably ensure high alignment accuracy of the first microlens array and the second microlens array.

BRIEF DESCRIPTION OF THE DRAWINGS

Other and further objects, features, and advantages of the invention will be more explicit from the following detailed description taken with reference to the drawings wherein:

FIGS. 1A to 1D are sectional views which show, in stages, a process of forming a microlens array of a projection type of liquid crystal display apparatus of an embodiment of the present invention and show the microlens array cut on a virtual plane including a chief ray of a light flux;

FIG. 9 is a flowchart showing a method of manufacturing a microlens array;

FIGS. 10A to 10D show a process of manufacturing a microlens array in stages, which are sectional views of the microlens array;

FIG. 19 is a view showing a transmittance distribution taken on a line Y—Y in a case where the second lens has an aspheric shape;

FIG. 20 is a description view showing a positional relation between a stamper mold and the mask member, which is taken from a direction of thickness thereof;

DETAILED DESCRIPTION OF THE PREFERRED EMBODIMENTS

Figure 2:
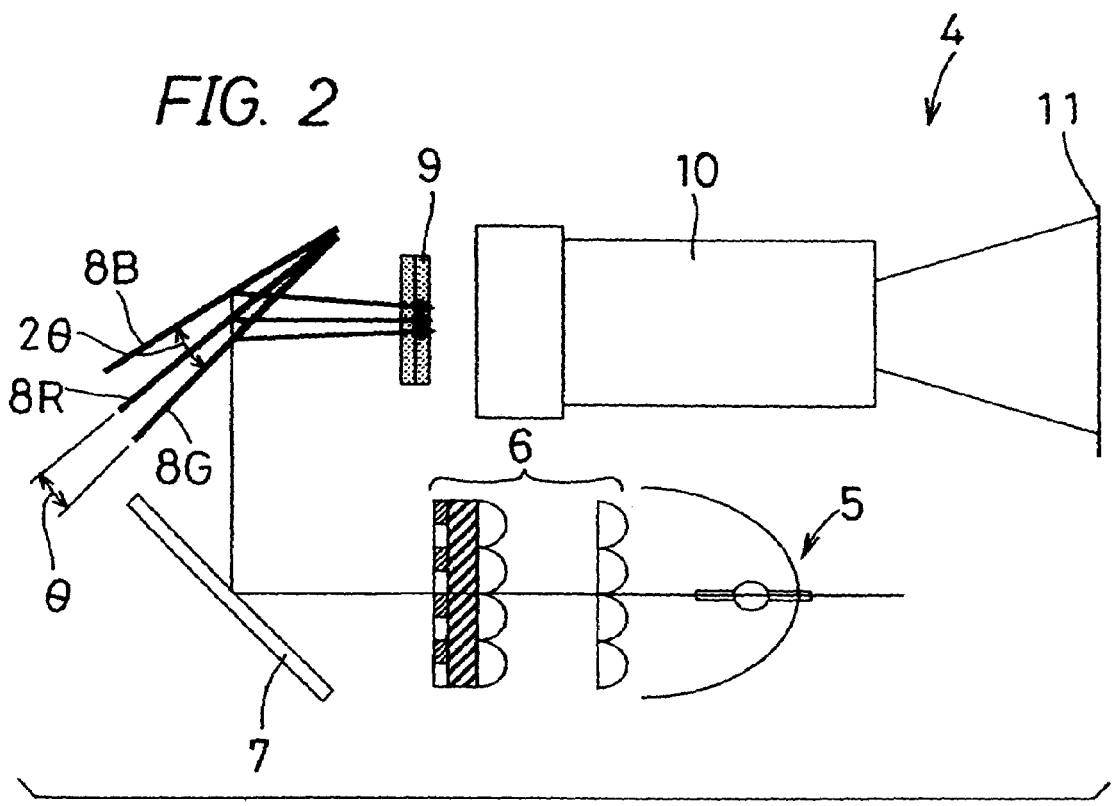
FIG. 2 is a schematic view showing an overall structure of a projection type of liquid crystal display apparatus.

Now referring to the drawings, preferred embodiments of the invention are described below.

FIGS. 1A to 1D are sectional views which show, in stages, a process of forming a microlens array of a projection type of liquid crystal display apparatus of an embodiment of the present invention and show the microlens array cut on a virtual plane including a chief ray of a light flux. FIG. 2 is a schematic view that shows the overall structure of a projection type of liquid crystal display apparatus 4. This embodiment shows an example of the application of the microlens array of the invention to, for example, a projection type of liquid crystal display apparatus. It is noted that FIG. 1A corresponds to FIG. 10C mentioned later, FIG. 1B corresponds to FIG. 10D mentioned later, FIG. 1C corresponds to FIG. 11A mentioned later, and FIG. 1D corresponds to FIG. 11B mentioned later. A description of a method of manufacturing a microlens array 1 is described below.

The liquid crystal projector 4 as a projection type of liquid crystal display apparatus has a white light source 5 as a light source, an integrator 6, a mirror 7, color separation mirrors 8R, 8G, 8B as light flux dividing means, a liquid crystal panel unit 9, a projection lens 10, and a screen 11. In the white light source 5, halogen, high-pressure mercury or the like is used. On one side in a light-emitting direction of this white light source 5, the integrator 6 such as a fly eye lens is placed. A light source distribution and an orientation distribution of light that is emitted from the white light source 5 are uniformized by the integrator 6.

On one side in a light-emitting direction of the integrator 6, the mirror 7 is placed. The mirror 7 is placed, with respect to a virtual plane that is parallel to the light-emitting direction and perpendicular to a light-reflecting direction thereof, at an inclination angle of 45°, that is, at an inclination angle that it is inclined to the light-reflecting direction as it is away from the light source 5. In the light-reflecting direction of the mirror 7, three kinds of color separation mirrors 8R, 8G, 8B (also referred to as dichroic mirrors 8R, 8G, 8B) are placed. In light-reflecting directions of these color separation mirrors 8R, 8G, 8B, the liquid crystal panel unit 9 that includes a microlens array, the projection lens 10, and the screen 11 are placed and disposed in this order. More specifically, the projection lens 10 is placed with a specified space away from the liquid crystal panel unit 9, and the screen 11 is placed in a light-exiting direction of the projection lens 10.

The three kinds of color separation mirrors 8R, 8G, 8B are placed at different angles, respectively. A white light flux that enters into the color separation mirrors 8R, 8G, 8B is divided into the three primary colors of red, green and blue, respectively, and the respective divided light fluxes enter into a first microlens array 12, which will be described later, at different angles, respectively. The color separation mirrors 8R, 8G, 8B have a characteristic of selectively reflecting light of the respective wavelength bands corresponding to red, green and blue, respectively, and transmitting the rest.

These color separation mirrors for green, red and blue, 8G, 8R, 8B are placed in this order in the light-reflecting direction of the mirror 7. The color separation mirror for red BR is disposed so that a light flux from the mirror 7 enters at an incident angle of, for example, approximately 45°. This incident angle is an angle with respect to the normal that is orthogonal to a plane portion of each of the color separation mirrors 8G, 8R, 8B. The color separation mirror for blue 8B placed in front of the color separation mirror for red 8R in a traveling direction of light from the light source is disposed at an inclination angle θ with respect to a virtual plane that includes the color separation mirror for red 8R, so that an incident angle thereof becomes smaller than that of the light flux from the mirror 7 with respect to the color separation mirror 8R. The color separation mirror for green 8G placed in the rear of the color separation mirror for red 8R in the traveling direction of the light from the light source is disposed at an inclination angle θ with respect to the virtual plane that includes the color separation mirror for red 8R, so that an incident angle thereof becomes larger than that of the light flux from the mirror 7 with respect to the color separation mirror 8R.

In a case where the color separation mirrors for green, red and blue 8G, 8R, 8B are placed in the aforementioned manner, respective light fluxes 2G, 2R, 2B (shown in FIG. 3) of a green wavelength band, a red wavelength band and a blue wavelength band enter into the first microlens array 12 while deviating by 2θ degrees. In specific, the light flux of the red wavelength band enters perpendicularly into a light exit face of the first microlens array 12.

Figure 3:
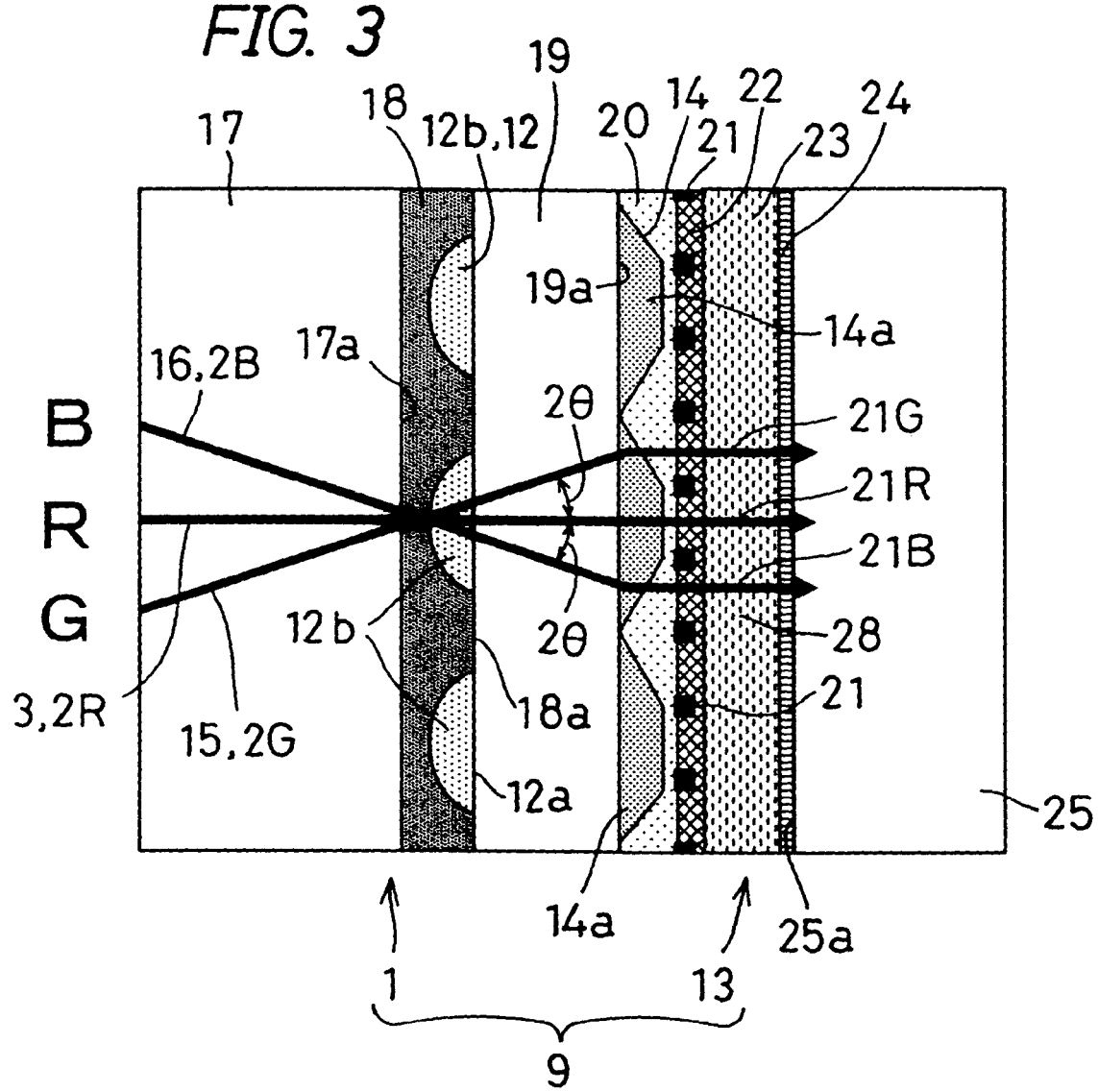
FIG. 3 is a sectional view showing a liquid crystal panel unit including a microlens array cut on a virtual plane including a chief ray 3 of a light flux 2R.

FIG. 3 is a sectional view showing the liquid crystal panel unit 9 that includes the microlens array 1 cut on a virtual plane that includes a chief ray 3 of the light flux 2R. The liquid crystal panel unit 9 mainly has the microlens array 1 (there is a case of referring to as a two-layer microlens array 1) and a liquid crystal display element 13. The microlens array 1 has an action of efficiently transmitting the light fluxes 2R, 2G, 2B to picture element positions of the liquid crystal display element 13 by cooperation of the first microlens array 12 and a second microlens array 14. In specific, the second microlens array 14 exerts an action of refracting chief rays 15, 16 of the respective light fluxes 2G, 2B of the green wavelength band and the blue wavelength band by 2θ degrees in a direction of making them substantially parallel to the chief ray 3 of the light flux 2R of the red wavelength band.

The microlens array 1 has a protection board 17, a planarizing layer 18, the first microlens array 12 (there is a case of referring to as a first microlens 12 or, simply, a first lens 12), an intermediate board 19, the second microlens array 14 (there is a case of referring to as a second microlens 14 or, simply, a second lens 14), a planarizing layer 20, and a black matrix 21. On one surface portion 17a of the protection board 17 made of a light-transmitting resin, the first lens 12 is formed via the planarizing layer 18. The planarizing layer 18 is formed by the use of a resin that has a low refraction index, which will be described later, and the first lens 12 is formed by the use of a resin that has a high refraction index, which will be described later.

One surface portion 18a of the planarizing layer 18 and a plane portion 12a of the first lens 12 are formed so as to become the same plane, and the intermediate board 19 is attached to the one surface portion 18a and the plane portion 12a. It is preferable to apply, as the intermediate board 19, a material whose efficiency of transmitting visible radiation and ultraviolet radiation is good and whose thermal expansion coefficient is small. More specifically, as the intermediate board 19, quartz that is ground into a specified thickness is applied, for example. On one surface portion 19a of this intermediate board 19, the second lens 14 is formed, and moreover, the planarizing layer 20 having a low refraction index (also referred to as a low-refraction-index layer 20) is formed via the second lens 14. The second lens 14 is formed by the use of a resin whose refraction index is higher than that of the first lens 12. On one surface of the low-refraction-index layer 20, the black matrices 21 are formed at specified spaces.

On one surface of the microlens array 1 that faces the black matrix 21, the liquid crystal display element 13 is positioned, that is, placed and disposed. The liquid display element 13 comprises a transparent electrode 22 made of indium tin oxide (ITO) or the like, a liquid crystal layer 23, an electrode layer 24 including a thin film transistor (TFT) or the like, and a board 25. The electrode layer 24 is attached to one surface portion 25a of the board 25, and the liquid crystal layer 23 is interposed between the transparent electrode 22 and the electrode layer 24.

Figure 4:
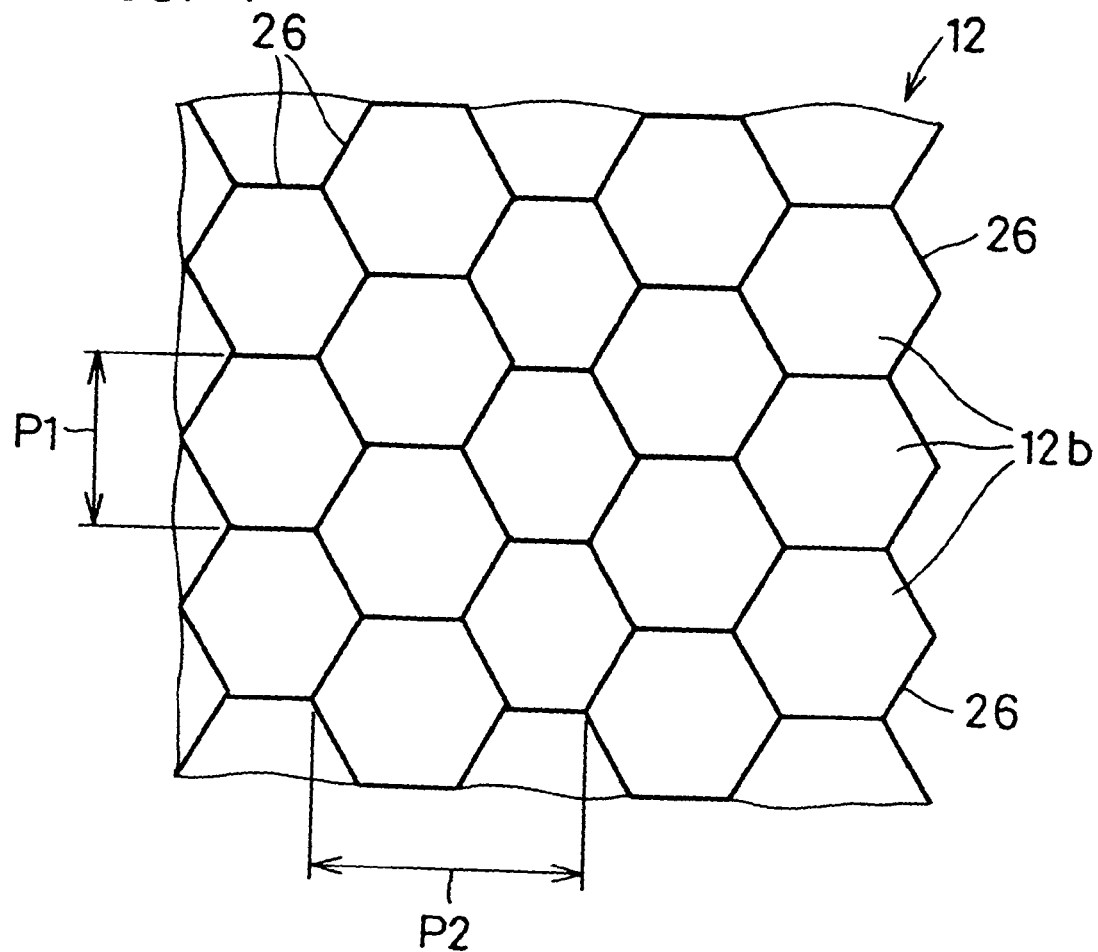
FIG. 4 is a plan view that shows an outer shape of a first lens and takes the first lens from a direction orthogonal to a lens forming face.
Figure 5:
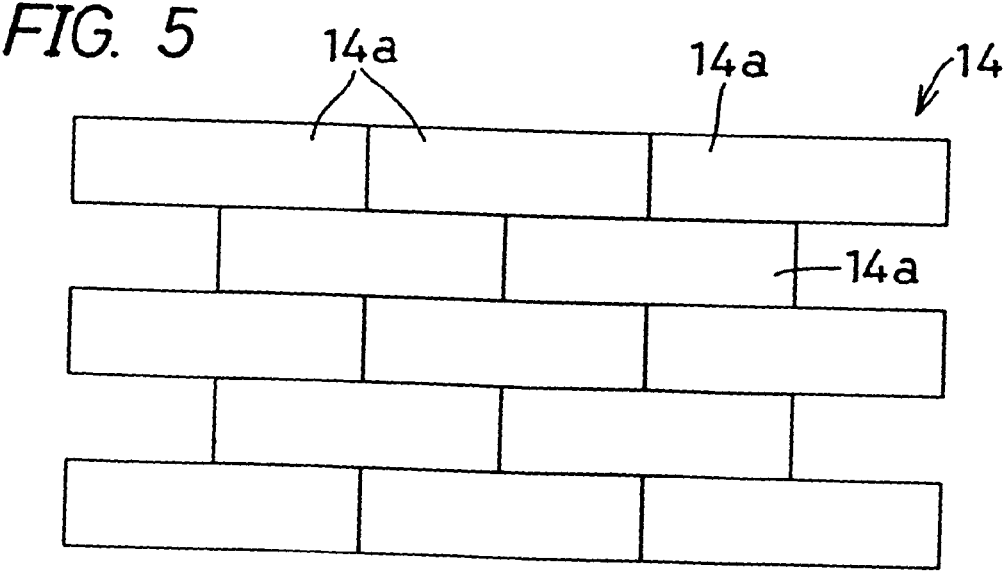
FIG. 5 is a plan view that shows an outer shape of a second lens and takes the second lens from a direction orthogonal to a lens forming face.
Figure 6:
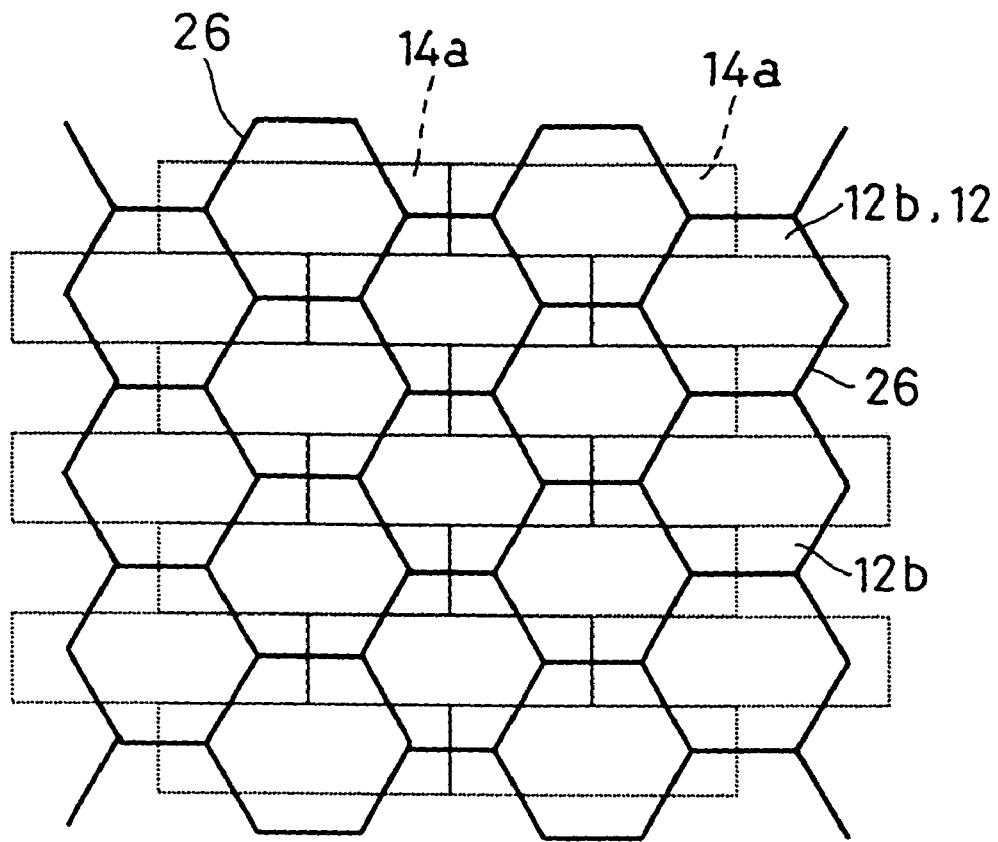
FIG. 6 is a description view showing a positional relation between the first lens and the second lens taken from a direction orthogonal to the lens forming faces thereof.
Figure 7:
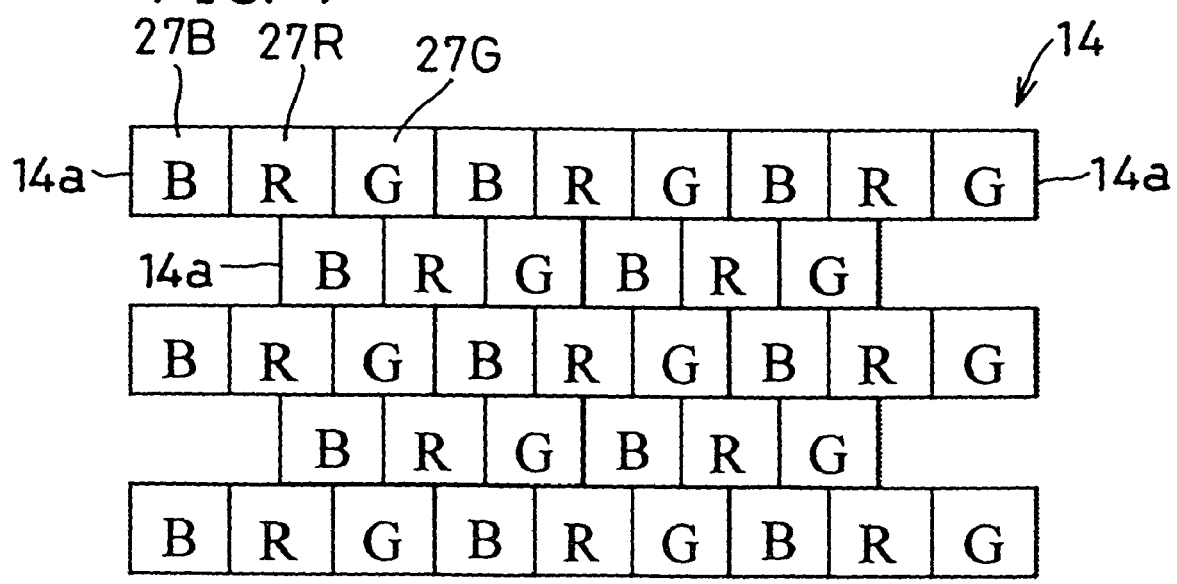
FIG. 7 is a description view showing a disposition relation between the second lens and pixels that correspond to respective light fluxes of red, green and blue.
Figure 8:
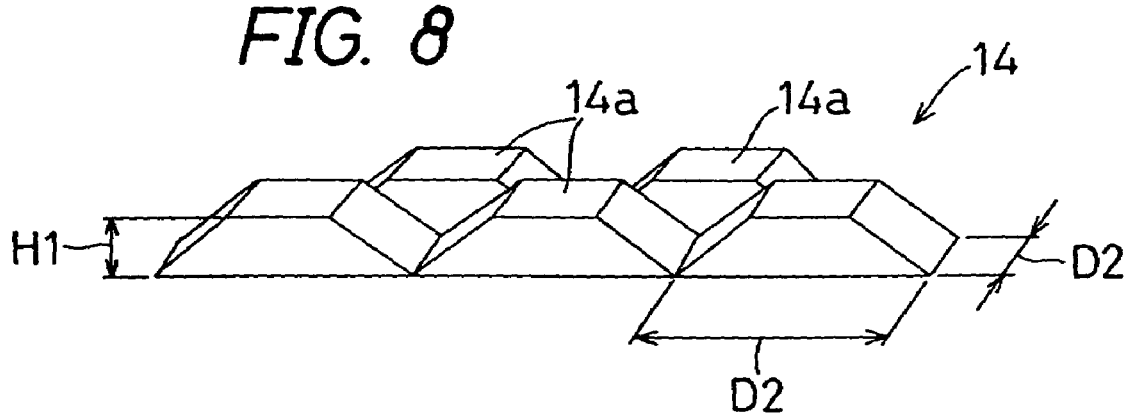
FIG. 8 is a perspective view of the second lens.

FIG. 4 is a plan view that shows the outer shape of the first lens 12 and takes the first lens 12 from a direction orthogonal to a lens forming face. FIG. 5 is a plan view that shows the outer shape of the second lens 14 and takes the second lens 14 from a direction orthogonal to a lens forming face. FIG. 6 is a description view that shows a positional relation between the first lens and the second lens taken from a direction orthogonal to the lens forming faces thereof. FIG. 7 is a description view that shows a disposition relation between the second lens 14 and pixels corresponding to the respective light fluxes of red, green and blue. FIG. 8 is a perspective view of the second lens 14.

The first lens 12 includes a plurality of spherical lenses 12b that protrude like convex shapes. Of the respective spherical lenses 12b, outer peripheral portions 26 that face the intermediate board 19 (refer to FIG. 3) are formed into regular hexagons when the first lens 12 is taken from a direction orthogonal to the lens forming face thereof. The outer peripheral portions 26 of the respective spherical lenses 12b abut on the outer peripheral portions 26 of the adjacent spherical lenses 12b, respectively, and the plural spherical lenses 12b are placed in a close-packed structure like a honeycomb when taken in the thickness direction. With respect to a virtual plane perpendicular to the chief ray 3 of the red light flux 2R shown in FIG. 3, a pitch of a pair of spherical lenses 12b that share one side of the outer peripheral portion 26 and that are adjacent to each other is defined as a vertical pitch P1, and the vertical pitch P1 is set to, for example, approximately 30 μm. With respect to the virtual plane, in one spherical lens 12b placed on a top of the outer peripheral portion 26 of another spherical lens 12b on both sides of one side of the outer peripheral portion 26, a pitch between the one and the other spherical lenses 12b is defined as a horizontal pitch P2. This horizontal pitch P2 is set to, for example, approximately 45 μm. The radius of curvature of each spherical lens 12b is set to, for example, approximately 15 μm. In this manner, the plural spherical lenses 12b of the first lens 12 are placed at specified spaces.

The second lens 14 is placed in a close-packed structure, and a pixel arrangement thereof is a delta arrangement. More specifically, the respective lenses 14a are placed as shown in FIG. 3. Of major dimensions of each lens 14a, a long side of the lens 14a is defined as D1. This long side D1 is set to, for example, approximately 45 μm. Of the major dimensions, a short side of the lens 14a is defined as D2. This short side D2 is set to, for example, approximately 15 μm. Of the major dimensions, a dimension in the thickness direction of the lens 14a is defined as a height dimension H1, and this height dimension H1 is set to, for example, approximately 20 μm.

In the projection type of liquid crystal display apparatus 4 described above, a light source distribution and an orientation distribution of light that is emitted from the white light source 5 are uniformized via the integrator 6. After that, the uniformized light is caused to enter into each of the color separation mirrors 8R, 8G, 8B through the mirror 7, and light of the respective wavelength bands corresponding to colors of red, green and blue are selectively reflected by each of these color separation mirrors 8R, 8G, 8B. After that, the respective light fluxes 2G, 2R, 2B of the green wavelength band, the red wavelength band and the blue wavelength band enter into the liquid crystal panel unit 9.

Of these light fluxes 2G, 2R, 2B, the light flux 2R of the red wavelength band is refracted by the first lens 12, and enters into the second lens 14 as convergence light. Here, a focal position of the first lens 12 is designed to be around the center of an opening portion 21R of the black matrix 21, and a principal point of the second lens 14 that is not shown in the drawings and the focal position of the first lens 12 are considerably close to each other, so that an influence of the second lens 14 is small. Light of the red wavelength band transmitted by the second lens 14 is projected on the screen 11 by the projection lens 10.

Of the plural light fluxes 2G, 2R, 2B, the chief ray 16 of the light flux 2B of the blue wavelength band is inclined by 2θ degree with respect to the chief ray 3 of the light flux 2R of the red wavelength band by the color separation mirror for blue 8B, and enters into the liquid crystal panel unit 9. The chief ray 16 of the light flux 2B of the blue wavelength band enters into the second lens 14 while keeping the same inclination angle as described before with respect to the chief ray 3 of the light flux 2R of the red wavelength band even after being transmitted by the first lens 12. This second lens 14 refracts light of the blue wavelength band in a direction substantially parallel to the chief ray 3 of the light flux 2R of the red wavelength band. By such actions of the first lens 12 and the second lens 14, light of the blue wavelength band converges around the center of an opening portion 21B of the black matrix 21. A chief ray 15 of the light flux 2G of the green wavelength band has a symmetrical relation with the chief ray 16 of the light flux 2B of the blue wavelength band with respect to the chief ray 3 of the light flux 2R of the red wavelength band. Therefore, after entering into the second lens 14 through the first lens 12, light of the green wavelength band converges around the center of an opening portion 21G of the black matrix 21. The respective colors of red, green and blue transmitted by the black matrix 21 are modulated in a liquid crystal panel pixel portion 28 of the liquid crystal layer 23, and projected on the screen 11 by the projection lens 10.

According to the projection type of liquid crystal display apparatus 4 described above, by a converging effect of the first lens 12 of the microlens array 1 of the liquid crystal panel unit 9, more light passes through the opening portions of the black matrix 21 and the liquid crystal panel pixel portion 28, and contributes to increase of the efficiency of use of light. Therefore, the efficiency of use of light increases, and it is allowed to make a display screen brighter. Moreover, the chief rays 15, 16 of the green and blue colors keep the angles 2θ with respect to the chief ray 3 of the red color by the color separation mirrors for green and blue 8G, 8B. By correcting these chief rays 15, 16 of the green and blue colors by the second lens 14 of the microlens array 1 so as to become substantially parallel to the chief ray 3 of the red color, a spreading angle of a light flux after being transmitted by the liquid crystal panel unit 9 is suppressed.

By an effect of suppressing a light flux spreading angle of the second lens 14, it is possible to prevent loss of light resulting from 'an eclipse' of the projection lens 10. Therefore, by a synergy effect of the first lens 12 and the second lens 14, it is possible to exceedingly increase the efficiency of use of light as compared with the related art disclosed in the publications. By the effect of suppressing a light flux spreading angle of the second lens 14, it is possible to set a focal length of the spherical lens 12b of the first lens 12 to, for example, approximately one half or less.

Therefore, it is possible to cause light rays emitted from the light source 5, most of the light rays being not paralleled completely, to pass through the openings of the black matrix 21. In this manner, a free design change for increase of the efficiency of use of light is enabled. In other words, since flexibility in design of the microlens array 1 is considerably increased as compared with in the related art, it becomes possible to obtain the microlens array 1 that can realize optimum efficiency of use of light.

Here, the focal length of the first lens and a spread of a light flux after exiting from the second lens will be described. Assuming that NA of a conventional one layer type of microlens array is NA1, the focal length is f1 and a picture element pitch of liquid crystal is p, a spreading angle (half angle) α of a light flux that enters into a projection lens is defined by the sum of an NA part of the first lens and an inclination angle of a chief ray that enters into each picture element, and the following expression is obtained:

$$\alpha = \sin^{-1}(p/f1) + \tan^{-1}(p/f1).$$

On the other hand, in the case of a two layer type of microlens array, an inclination angle at the time of entering into each picture element is almost 0 degree, so that a spreading angle (half angle) α' of a light flux that enters into a projection lens is found from the following expression, assuming that the focal length of the first lens is f2:

$$\alpha' = \sin^{-1}(p/f2).$$

Here, assuming that α=α', f2=f1/2 is satisfied.

(In a region where an angle β is small, sin β≈tan β is satisfied.)

Figure 11A:
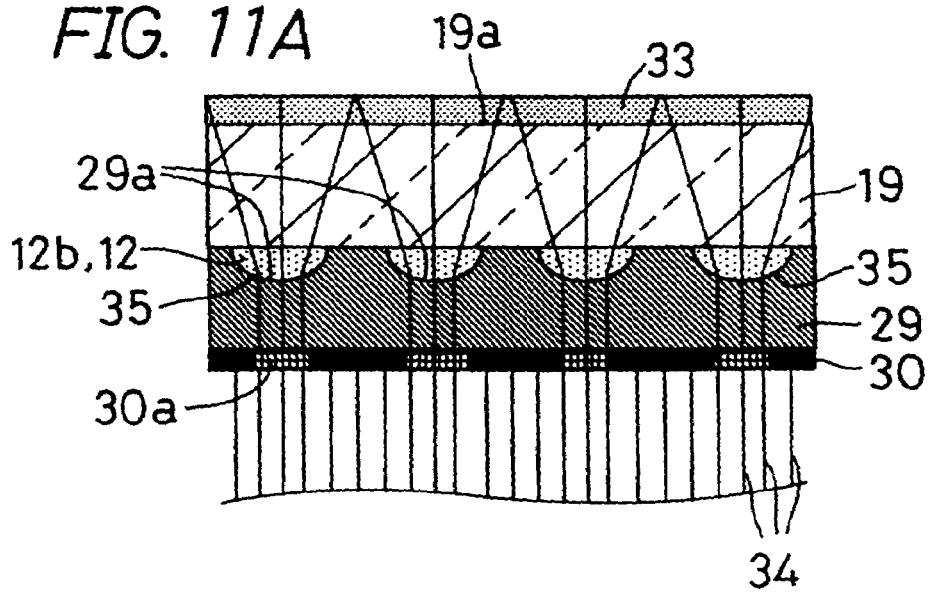
FIGS. 11A to 11C show an advanced process of the process of FIGS. 10A to 10D in stages, which are sectional views of the microlens array.
Figure 11B:
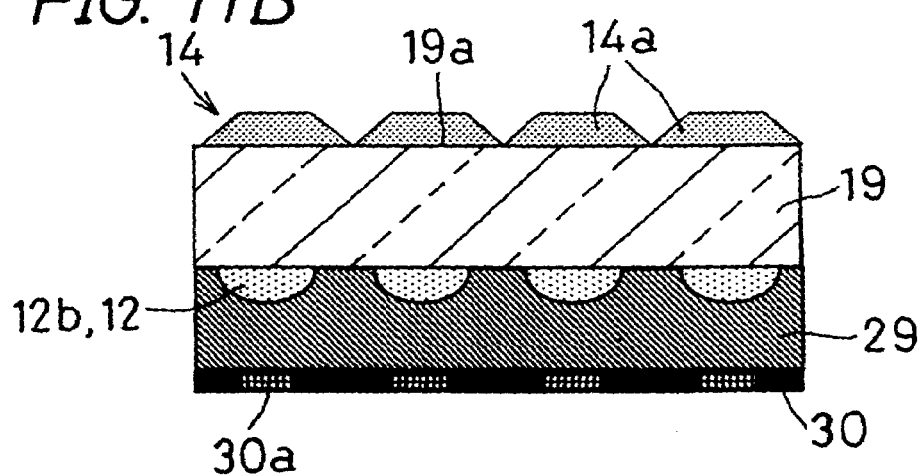
Figure 11C:
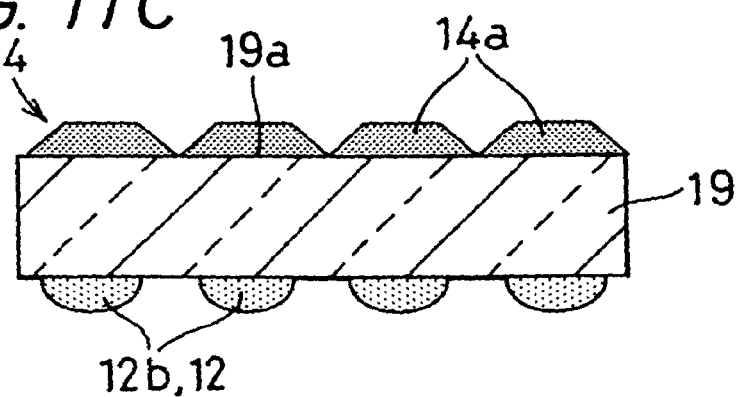
Figure 12A:
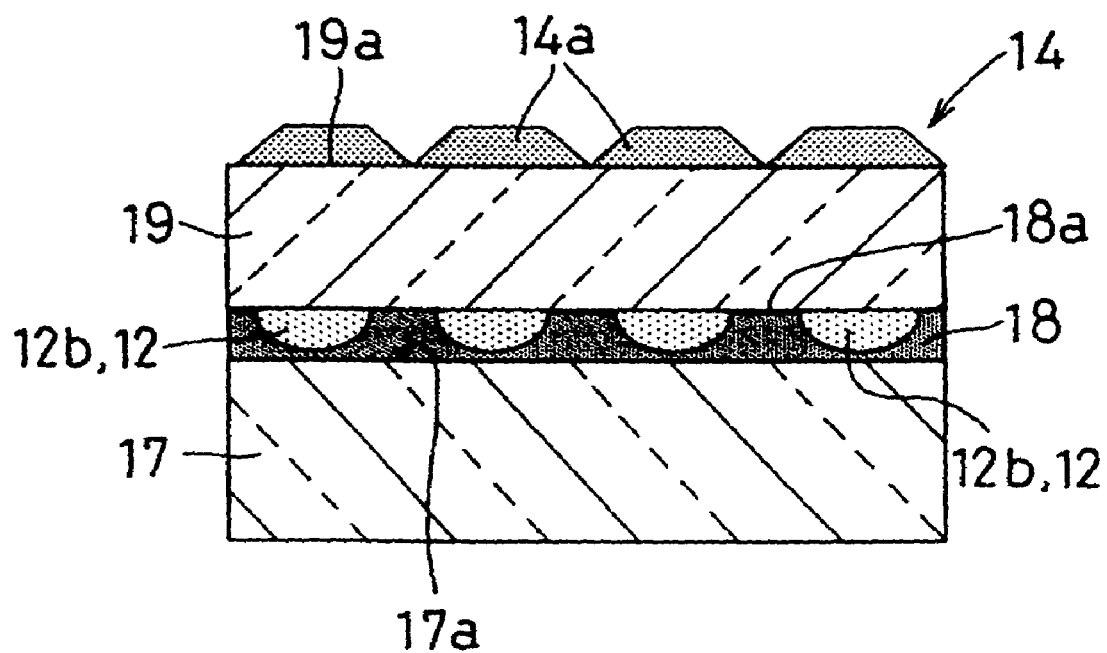
FIGS. 12A, 12B show an advanced process of the process of FIGS. 11A to 11C in stages, which are sectional views of the microlens array.
Figure 12B:
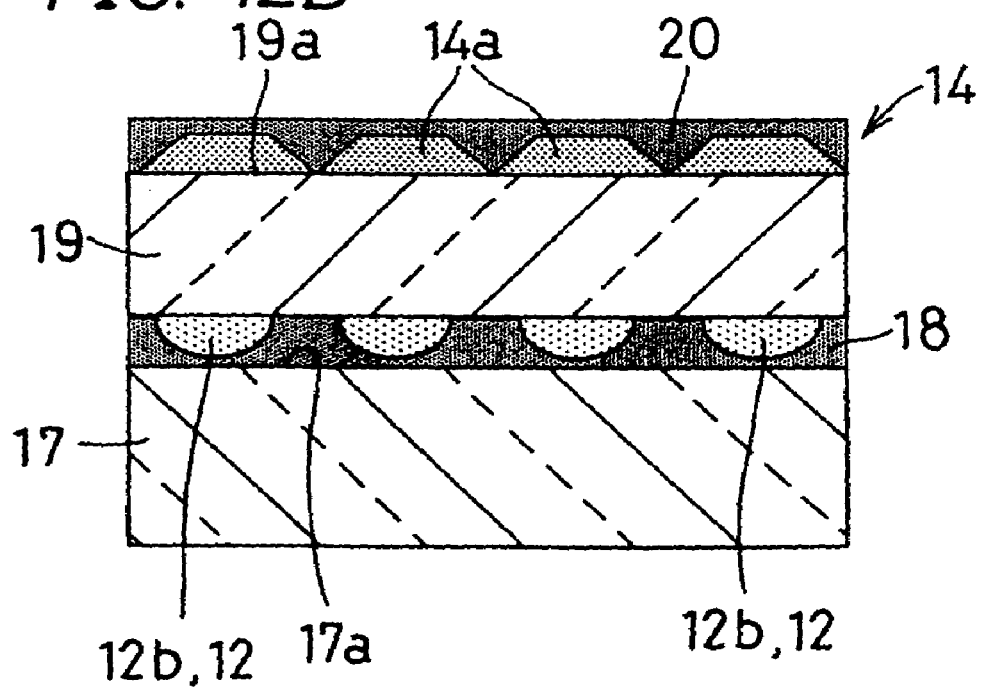

FIG. 9 is a flowchart showing a method of manufacturing a microlens array. Here, Si (i=1, 2, 3, . . . ) presents a step. FIGS. 10A to 10D show a process of manufacturing a microlens array in stages, which are sectional views of the microlens array. FIGS. 11A to 11C show an advanced process of the process of FIGS. 10A to 10D in stages, which are sectional views of the microlens array. FIGS. 12A, 12B show an advanced process of the process of FIGS. 11A to 11C in stages, which are sectional views of the microlens array.

As shown in step S1 of FIG. 9 and FIGS. 10A to 10D, the first lens 12 is produced by the use of a stamper mold 29 that corresponds to the shape of the first lens 12. The refraction index of the stamper mold 29 is set to a value higher than the refraction index of an ultraviolet curing resin for forming the first lens 12, for example, a refraction index of approximately 2.07. On one end face in the thickness direction of the stamper mold 29, a plurality of concave portions 29a that are stamper portions formed into shapes responsive to the shape of the first lens 12 are formed. In specific, the stamper mold 29 is held with the concave portions 29a directing upward in the substantially vertical direction, and the first lens 12 is produced. As shown in FIG. 10A, on the other end face in the thickness direction of the stamper mold 29, a mask member 30 made in one piece with this stamper mold 29 is positioned, that is, placed and disposed. The positional relation between this mask member 30 and the stamper mold 29 will be described later. The mask member 30, which will be described later, is a member for forming the second lens 14 (refer to FIGS. 11A to 11C, 12A, 12B), and has a preset light transmittance distribution.

As shown in FIG. 10B, on the plural concave portions 29a of the stamper mold 29 and the one end face in the thickness direction of the stamper mold 29, a first ultraviolet curing resin layer 31 is placed so as to be substantially parallel to the one end face. Next, as shown in FIG. 10C., to this placed ultraviolet curing resin layer 31 and the stamper mold 29, the intermediate board 19 is pressed by an appropriate pressure force. By thus pressurizing between the stamper mold 29 and the intermediate board 19 by an appropriate pressure, it is possible to remove an ultraviolet curing resin placed to a part other than the plural concave portions 29a, that is, an extra ultraviolet curing resin. After the intermediate board 19 is pressed for a specified time period, the ultraviolet curing resin layer 31 molded in a desired shape is irradiated with an ultraviolet ray 32 from one side in the thickness direction of the intermediate board 19. As a result, the ultraviolet curing resin layer 31 is cured, and the first lens 12 is produced. This ultraviolet curing resin used here has a high refraction index. In this embodiment, an ultraviolet curing resin whose refraction index is, for example, approximately 1.59 is used.

Next, as shown in step S2 of FIG. 9 and FIG. 10D, a photosensitive resin, which is a photosensitive material, is applied to the other end face 19a in the thickness direction on the rear side of one end face in the thickness direction of the intermediate board 19 that faces the stamper mold 29. It is preferable to use, also as an ultraviolet curing resin layer 33 as this photosensitive resin, one having a high refraction index like the ultraviolet curing resin layer 31. In specific, in this embodiment, as the ultraviolet curing resin, for example, one having a refraction index of approximately 1.59 is used. At the time of applying the ultraviolet curing resin to the other end face 19a in the thickness direction of the intermediate board 19, there is a need to properly define the number and the position of resin discharging openings of a not-shown applying device and the amount of the resin so that the ultraviolet curing resin layer 33 is applied to the other end face 19a substantially uniformly and of required thickness or more. In other words, by properly defining the number and the position of the resin discharging openings and the amount of the resin, it becomes possible to apply the ultraviolet curing resin layer 33 to the other end face 19a in the thickness direction of the intermediate board 19 substantially uniformly and in required thickness or more.

Next, as shown in step S3 of FIG. 9 and FIG. 11A, from one side in the thickness direction of the mask member 30, via the first lens 12, the second ultraviolet curing resin layer 33 is irradiated with an ultraviolet ray 34.

The ultraviolet light transmitted by the mask member 30 equals parallel light having an intensity distribution responsive to the second lens 14. More specifically, the ultraviolet light transmitted by the mask member 30 is caused to enter into the first lens 12. Since the refraction index of the stamper mold 29 is set higher than the refraction index of the ultraviolet curing resin that forms the first lens 12, the ultraviolet light transmitted by the first lens 12 is subjected to a lens effect at border portions 35 between the respective spherical lenses 12b of the first lens 12 and the respective concave portions 29a. Therefore, the ultraviolet light of parallel light becomes divergent light fluxes at the border portions 35.

By these divergent light fluxes, in the second ultraviolet curing resin layer 33, a light amount distribution which reflects the shape of the second lens 14 is caused. Since curing hardness of the ultraviolet curing resin changes in accordance with the light amount, it is possible to form the second lens 14. The reason of making the ultraviolet light of parallel light divergent light fluxes at the border portions 35 in this embodiment is that a projection face of the second lens 14 is larger than a projection face of the first lens 12 and there is a need to magnify and project the exposing ultraviolet light transmitted by the first lens to the second lens 12 forming face.

After that, as shown in FIG. 11B, an unnecessary ultraviolet curing resin is removed from the intermediate board 19 by the use of an organic solvent or the like. As shown in FIG. 11C, the intermediated board 19 and the first lens 12 are released from the stamper mold 29. Next, as shown in FIG. 12A, to one surfaces of the intermediate board 19 and the first lens 12, the protection board 17 is joined via the planarizing layer 18. The planarizing layer 18 is made of an ultraviolet curing resin which has a low refraction index, and in specific, the planarizing layer 18 used here has a refraction index of, for example, approximately 1.41. Therefore, the first lens 12 acts as a lens that has a positive refraction index.

Furthermore, as shown in FIG. 12B, after an ultraviolet curing resin is applied to one surfaces of the intermediate board 19 and the second lens 14 and cured, one surface of this ultraviolet curing resin is ground and planarized, whereby the low-refraction-index layer 20 is formed. This low-refraction-index layer 20 is also made of an ultraviolet curing resin that has a low refraction index like the planarizing layer 18. In specific, as this low-refraction-index layer 20, one having a refraction index of, for example, approximately 1.41 is used. After that, on the surface of the low-refraction-index layer 20, the black matrix (not shown), ITO (not shown) and an orientation layer (not shown) are formed, and a one-side board of the liquid crystal panel unit is formed.

Figure 13:
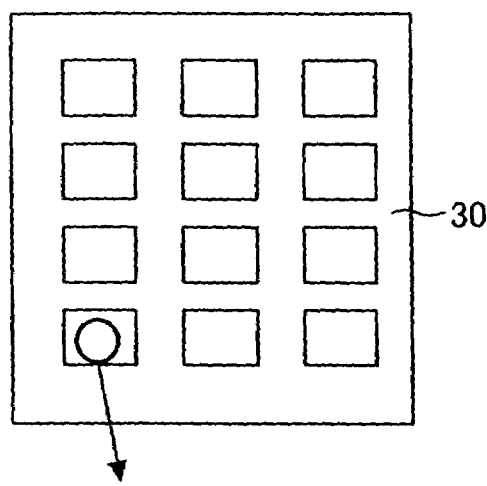
FIG. 13 is a plan view showing a mask member that is capable of exposing twelve chips in total of four lines and three arrows in one wafer taken from one side of a thickness direction thereof.
Figure 14:
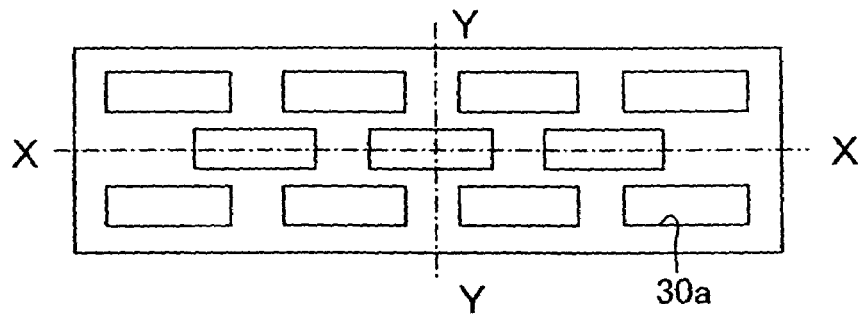
FIG. 14 is a magnified plan view of a major part of FIG. 13 that shows a transmittance distribution pattern in each chip.
Figure 15:
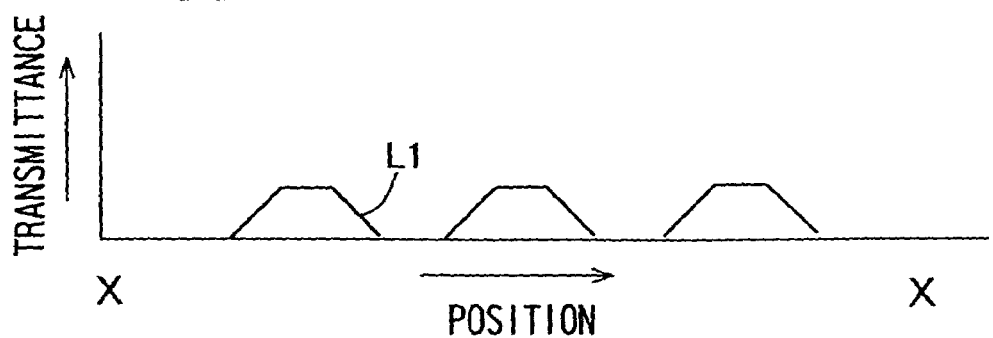
FIG. 15 is a view showing a transmittance distribution taken on a line X—X of FIG. 14.
Figure 16:
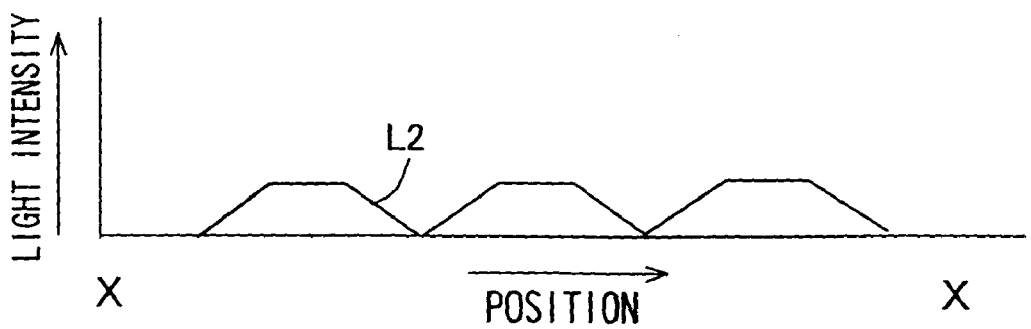
FIG. 16 is a view showing a light intensity distribution in a second lens forming region in the case of using a mask member which presents the transmittance distribution of FIG. 15.

FIG. 13 is a plan view showing the mask member 30 that is capable of exposing twelve chips in total of four lines and three rows in one wafer taken from one side in the thickness direction thereof. FIG. 14 is a magnified plan view of FIG. 13 showing a transmittance distribution pattern in each chip. FIG. 15 is a view showing a transmittance distribution taken on a line X—X of FIG. 14. FIG. 16 is a view showing a light intensity distribution in a second lens forming region in the case of using a mask member which presents the transmittance distribution of FIG. 15. In this embodiment, with respect to the shape of the second lens 14 as shown in FIG. 8, as the mask member 30, a mask member that has a transmittance distribution of an intensity distribution as described below is used.

That is to say, the transmittance distribution taken on the line X—X of FIG. 14, as shown in FIG. 15, forms a trapezoidal shape L1 that is a figure similar to a trapezoid of the lens 14a taken from a direction that is orthogonal to the thickness direction and the long side D1 of the lens 14a of FIG. 8. Moreover, a transmittance distribution taken on a line Y—Y of FIG. 14 becomes uniform with respect to the Y—Y line direction. Furthermore, the transmittance distribution shown in FIG. 15 is magnified by the first lens 12. Therefore, as shown in FIG. 16, in the second lens forming region, an intensity distribution of a continuous trapezoidal shape L2 which is equal to the close-packed lens shape is formed. Consequently, the second lens 14, as shown in FIGS. 11A to 11C is formed into a desired shape in the ultraviolet curing resin layer 33. The shape of the second lens 14 is defined by a relation between the curing thickness of the ultraviolet curing resin and this light intensity.

Figure 17:
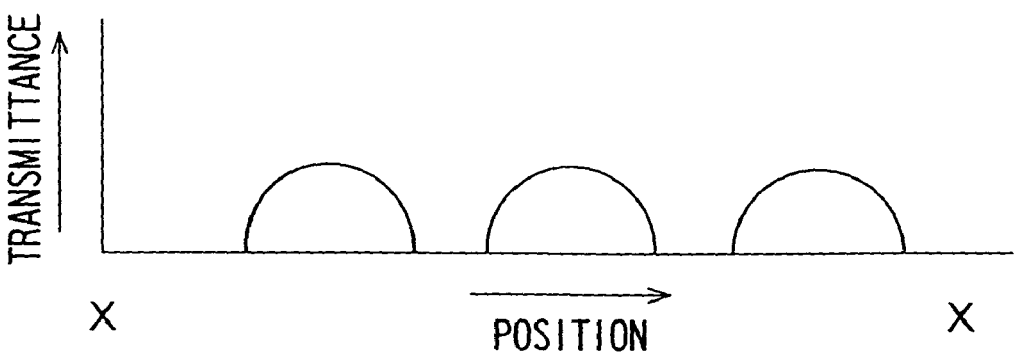
FIG. 17 is a view showing a transmittance distribution taken on the line X—X in a case where a second lens has a cylindrical shape.
Figure 18:
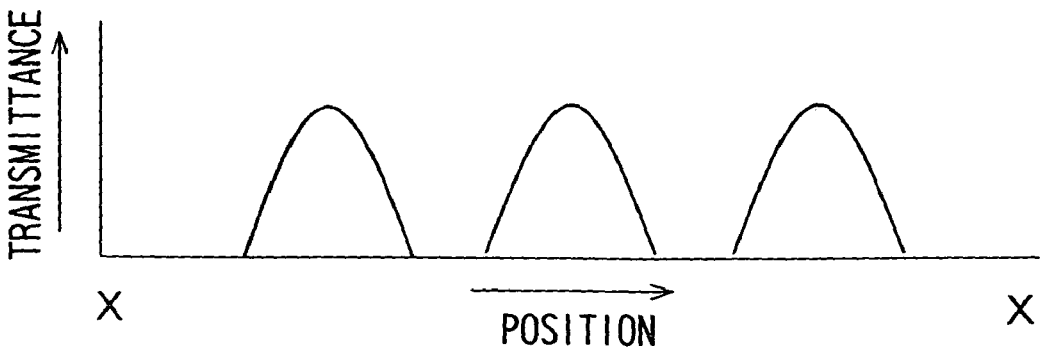
FIG. 18 is a view showing a transmittance distribution taken on the line X—X in a case where the second lens has an aspheric shape.

FIG. 17 is a view showing a transmittance distribution taken on the line X—X in a case where the second lens has a cylindrical shape. FIG. 18 is a view showing a transmittance distribution taken on the line X—X in a case where the second lens has an aspheric shape. FIG. 19 is a view showing a transmittance distribution taken on the line Y—Y in a case where the second lens has an aspheric shape. A transmittance distribution of the mask member for forming the second lens forms a figure similar to the shape of the second lens to be produced as described above in general.

However, by the transmittance of a wavelength used in exposure and the curing thickness of the ultraviolet curing resin with respect to the curing light intensity, the transmittance distribution is made to be proper. In this manner, the shape of the second lens 14 is defined by a relation between the curing thickness of the ultraviolet resin and this light intensity. In specific, in a case where the relation between the light intensity and the curing thickness of the ultraviolet curing resin is not a simple proportional relation, that is, in a case where it is not expressed by a linear function, a transmittance distribution of the mask member does not form a figure similar to the shape of the second lens to be produced.

The mask member 30 is formed by applying a material which changes transmittance of light of a specific wavelength to a quartz board serving as a light-transmitting board. In specific, by applying a silver based material that is exposed by an electron beam to one surface of a quartz board, the mask member 30 is formed. This mask member 30 is colored black depending on the dose amount of the electron beam, and it is possible to change transmittance from visible light to ultraviolet light. The structure of the mask member is not restricted to the above structure. For example, it may be made by preparing a board or a sheet material which is capable of transmitting ultraviolet light instead of a quartz board and forming on one surface of the board or the sheet material by the use of a method such as spraying or applying of a material of pigment, colorant or the like to change transmittance. The above material absorbs or reflects light of a specific wavelength.

Transmittance of light is designed in the following manner. In specific, as in this embodiment, in the case of using an ultraviolet curing resin as a photosensitive resin, transmittance is set so that the light amount becomes large at a position where lens thickness is desired to be thick, and transmittance is set so that the light amount becomes small at a position where lens thickness is desired to be thin. Moreover, with respect to a desired lens shape of the second lens 14, magnifying and reducing effects by the stamper mold 29 and the first lens 12 are considered. In specific, since this embodiment is shaped so that the long side D1 of the second lens 14 is larger than the outer dimension of the plane portion 12a of the first lens, a method of magnifying an intensity distribution shape of the mask member 30 by the first lens 12 and projecting to the second lens forming region is desirable. As a material of the stamper mold 29, one having a higher refraction index than the refraction index of the ultraviolet curing resin that forms the first lens 12 is used.

The material of the stamper mold 29 is, for example, high-refraction-index translucent ceramic produced by Murata Manufacturing Company, Ltd. The high-refraction-index translucent ceramic has a refraction index of approximately 2.07 and ultraviolet ray transmittance of approximately 50%. Consequently, the border portions 35 between the first lens 12 and the respective concave portions 29a act as concave lenses. Therefore, at the time of formation of the second lens 14, parallel light entering into the stamper mold 29 and the mask member 30 is provided with an intensity distribution based on an intensity distribution shape of the mask member 30, and becomes divergent light fluxes at the border portions 35. Since it is possible to obtain curing thickness of the ultraviolet curing resin responsive to the intensity distribution by irradiating the ultraviolet curing resin layer 33 with this divergent light fluxes, it is possible to form into a lens shape.

Here, since the first and second lenses 12, 14 have close-packed structures, and the first lens 12 is formed into a regular hexagon taken from a direction orthogonal to the lens forming face and the second lens 14 is formed into a rectangular taken from the thickness direction thereof as shown in FIGS. 4 to 7, it is necessary to magnify and project an image by the first lens 12 in order to form the second lens 14 by light transmitted by the first lens 12.

If light transmitted by the first lens 12 is unmagnified, it is impossible to make the lenses 12b of the first lens 12 correspond to the lenses 14a of the second lens 14 one to one. If light transmitted by the first lens 12 is reduced light, it is impossible to make the second lens 14 in a close-packed structure. Therefore, it is structured so as to have a negative refraction force at the border portions 35 between the respective lenses 12b and the respective concave portions 29a, and light fluxes entering into these border portions 35 as parallel light are made to diverge.

FIG. 20 is a description view showing the positional relation between the stamper mold 29 and the mask member 30 and taken from a direction of thickness thereof. A plurality of opening portions 30a for transmitting light of the mask member 30 are opened like rectangles, respectively, when seen from the thickness direction. The respective opening portions 30a are placed so as to correspond one to one to disposition positions of the respective concave portions 29a of the stamper mold 29, and when seen from the thickness direction, center portions of the respective opening portions 30a and center portions of the respective concave portions are placed so as to substantially match. In this embodiment, the term of 'substantially match' includes 'match.'

It is required to align the stamper mold 29 and the mask member 30 with high accuracy. In this embodiment, the alignment accuracy of the stamper mold 29 and the mask member 30 is set to, for example, approximately 1 μm or less including a cumulative error. At the time of production of the stamper mold 29, an alignment mark, which is not shown in the drawings, is formed at first. This alignment mark is a mark that allows relative detection of a position thereof with respect to the plural concave portions 29a relative to the lens shape of the first lens 12.

After that, one surface of the stamper mold 29 and one surface of the mask member 30 are bonded. At this moment, by using a not-shown electron beam drawing device to detect the alignment mark and drawing with respect to the detected alignment mark, it is possible to make the alignment accuracy of the stamper mold 29 and the mask member 30 to approximately 1 μm or less including a cumulative error. Although, as described above, highly accurate alignment is required in a preparation process before the process of producing the microlens array 1, it is possible to easily form the two-layer microlens array 1 as described above without such highly accurate alignment in the process of producing the microlens array 1 actually. In other words, after boding and integrating the stamper mold 29 and the mask member 30, it is possible to use this integrated body and repeatedly form a plurality of microlens arrays 1, so that it is possible to easily realize mass production of the microlens array 1.

As described above, by setting the focal length of the spherical lens 12b of the first lens 12 small and moreover making the microlens array 1 have a two-layer structure, it is possible to achieve efficiency of use of light approximately two times higher in a liquid crystal board of the same size, and it is possible to make the accuracy of alignment between the first lens 12 and the second lens 14 high to be approximately 1 μm or less, so that it is possible to obtain a projection type of liquid crystal display apparatus without screen irregularity and with good color reproducibility.

Further, according to the method of manufacturing the microlens array 1, by an operation of only irradiating the first lens 12 with parallel light having an intensity distribution responsive to the shape of the second lens 14 and irradiating the ultraviolet curing resin layer 33 with transmission light, the first lens 12 and the second lens 14 are placed with high alignment accuracy in a mutual positional relation thereof. Therefore, it is possible to increase optical characteristics of the first and second lenses 12, 14, and it is possible to prevent decrease of yield due to generation of a defective product. Besides, there is no need to align the first lens 12 and the second lens 14 by a mechanical operation every time when manufacturing one microlens array 1, and it is possible to shorten tact time. Moreover, a highly accurate aligning device and a bonding device are unnecessary, and it is possible to reduce the cost of equipment. In addition, since the position of the second lens 14 is inevitably defined in response to the first lens 12 and it is possible to place the two layers of first and second lenses 12, 14 with high accuracy, it is possible to easily obtain a projection type of liquid crystal display apparatus which has high efficiency of use of light and high quality without luminance irregularity or color mixture. In specific, by irradiating the first lens 12 with parallel light, it becomes possible to uniformly expose a large area, that is, the entire microlens array 1, and it becomes possible to expose by the wafer. In other words, if the first lens 12 is irradiated with divergent light or convergent light instead of the parallel light, a light ray angle differs depending on the position of the first lens 12 and an optical axis of the divergent light or convergent light. Therefore, it is impossible to uniformly expose the entire microlens array 1.

Figure 21:
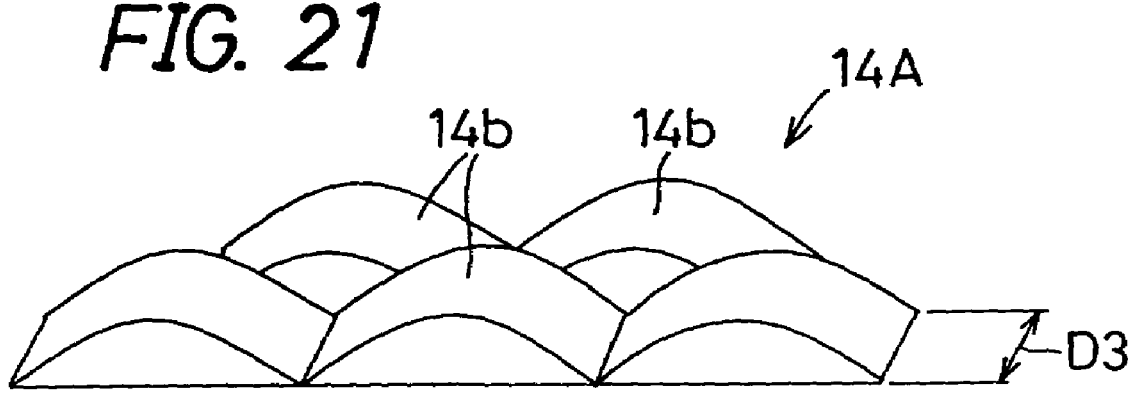
FIG. 21 is a perspective view of a second lens that is formed into a cylindrical shape.

FIG. 21 is a perspective view of a second lens 14A that is formed into a cylindrical shape. The second lens 14A may have a cylindrical shape as shown in FIG. 21. The second lens 14A is formed into a partially cylindrical shape about an axis that is parallel to a short side D3 of a lens 14b, and formed in a close-packed structure on one side in the thickness direction of the lens 14b. Since the second lens 14A is thus formed into a cylindrical shape, it is possible to avoid scattering of light. The scattering of light occurs because of light entering into an undesired position (for example, a corner portion) of the second lens 14. Therefore, by using the second lens 14A formed into a cylindrical shape, it is possible to increase an optical characteristic of the microlens 1 (refer to FIG. 3).

Figure 22:
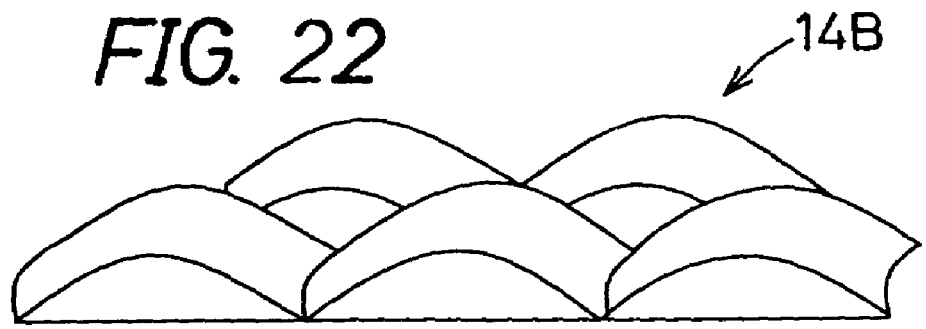
FIG. 22 is a perspective view of a second lens that is formed into an aspheric shape.

FIG. 22 is a perspective view of a second lens 14B formed that is into an aspheric shape. By thus forming the second lens 14B into an aspheric shape, it is possible to limit an aberration that is possibly caused by the second lens 14. Therefore, it is possible to further increase the efficiency of use of light.

Figure 23A:
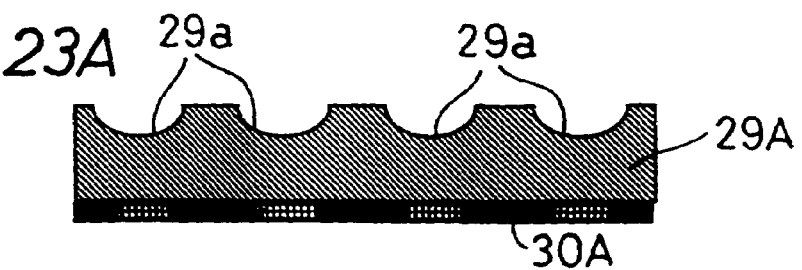
FIGS. 23A to 23D are sectional views that show, in stages, a process of manufacturing a microlens array of another embodiment of the invention and show the microlens array cut on a virtual plane including a chief ray of a light flux.
Figure 23B:
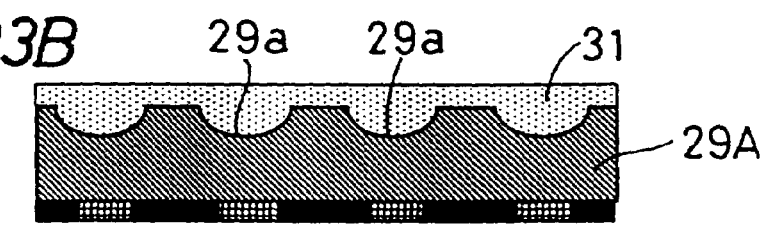
Figure 23C:
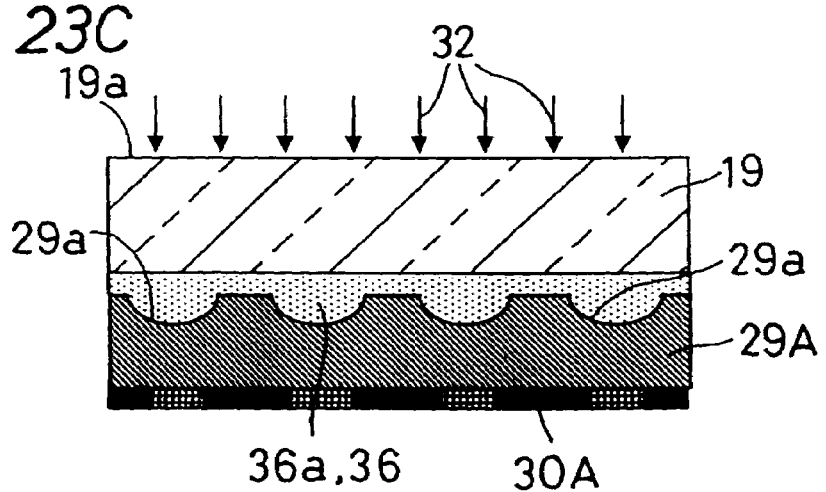
Figure 24A:
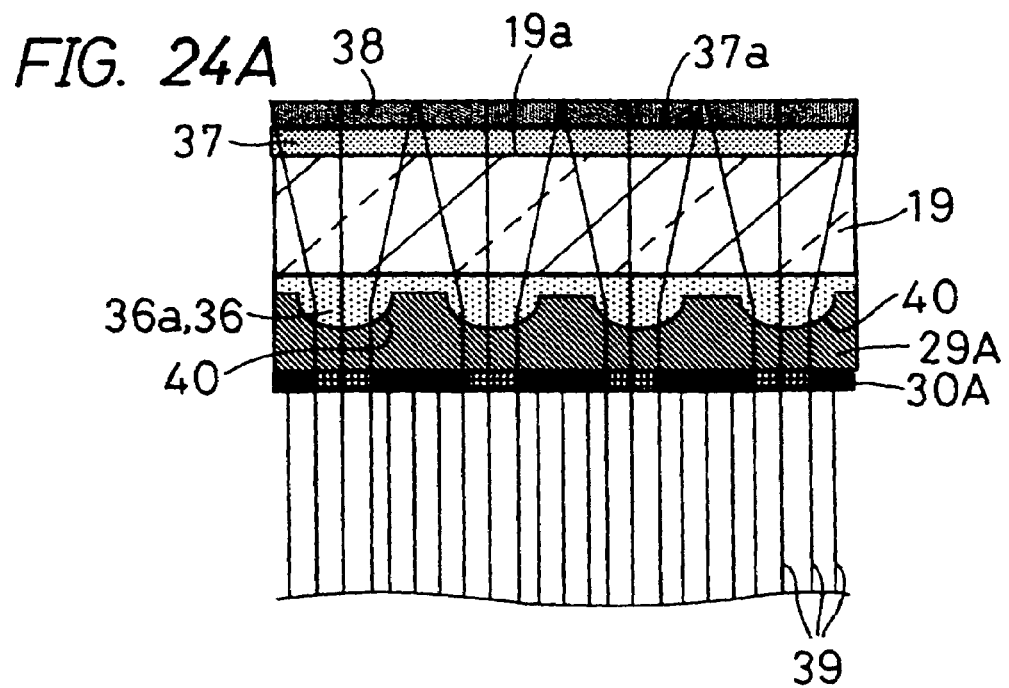
FIGS. 24A to 24C are sectional views that show, in stages, an advanced process of the process of FIGS. 23A to 23D and show the microlens array cut on a virtual plane including a chief ray of a light flux.
Figure 24B:
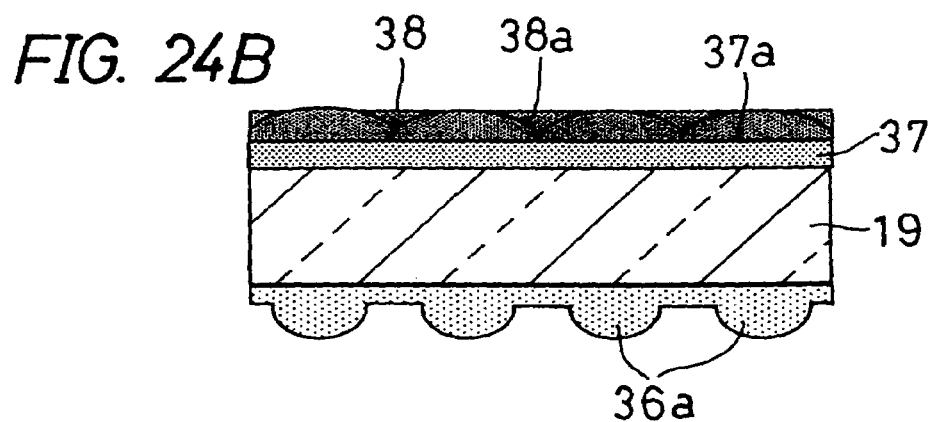
Figure 24C:
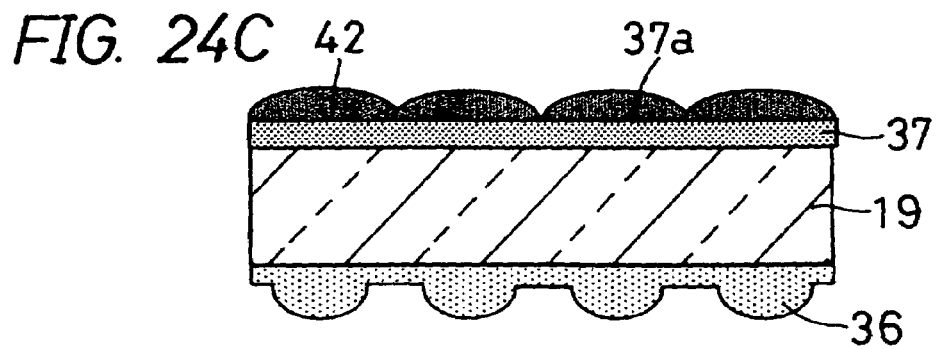
Figure 25A:
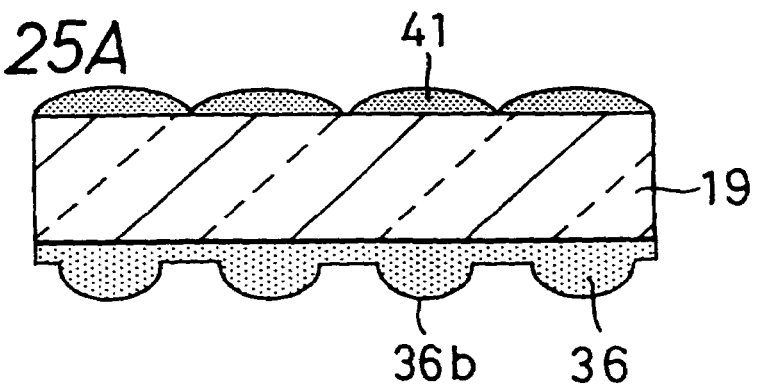
FIGS. 25A to 25C are sectional views that show, in stages, an advanced process of the process of FIGS. 24A to 24C and show the microlens array cut on a virtual plane including a chief ray of a light flux.
Figure 25B:
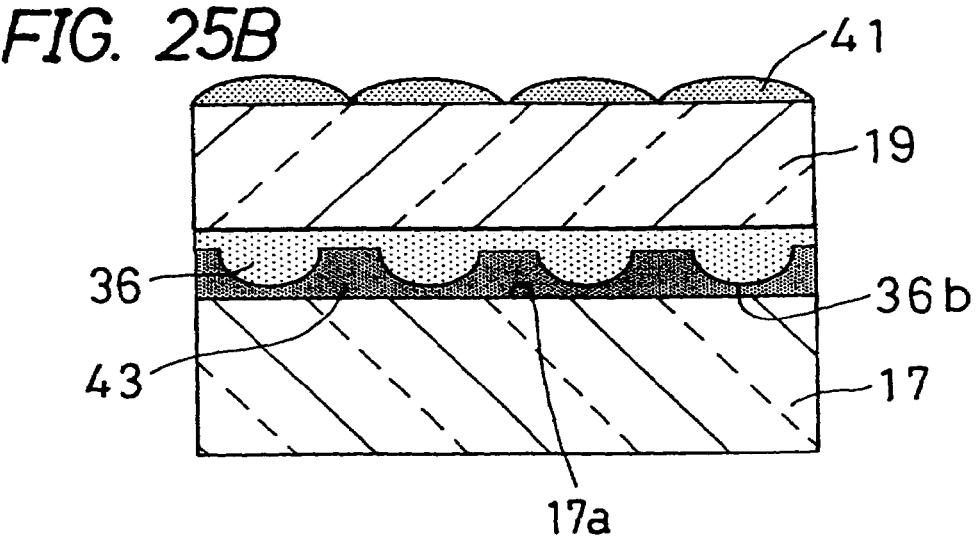
Figure 25C:
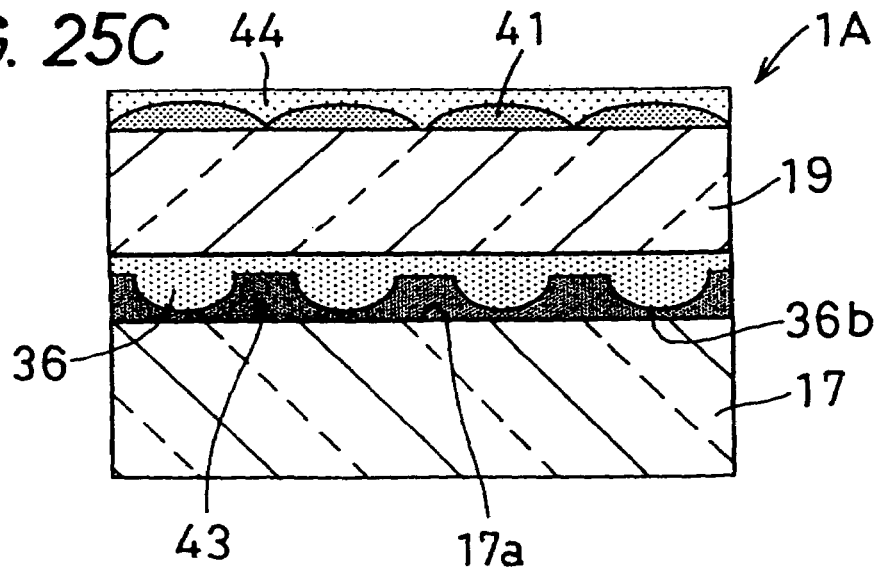

FIGS. 23A to 23D are sectional views which show, in stages, a process of manufacturing a microlens array 1A (refer to FIG. 25C) of another embodiment of the invention and show the microlens array 1A cut on a virtual plane including a chief ray of a light flux. FIGS. 24A to 24C are sectional views which show, in stages, an advanced process of the process of FIGS. 23A to 23D and show the microlens array cut on a virtual plane including a chief ray of a light flux. FIGS. 25A to 25C are sectional views which show, in stages, an advanced process of the process of FIGS. 24A to 24C and show the microlens array cut on a virtual plane including a chief ray of a light flux. In this embodiment, the same members as those of the aforementioned embodiment will be denoted by the same reference numerals, and it will be omitted to describe in detail.

A first lens 36 is produced by the use of a stamper mold 29A that corresponds to the shape of the first lens 36. As shown in FIG. 23A, the stamper mold 29A is held with the plural concave portions 29a directing upward in the substantially vertical direction. Next, as shown in FIG. 23B, on the plural concave portions 29a of the stamper mold 29A and the one end face in the thickness direction of the stamper mold 29A, the first ultraviolet curing resin layer 31 is placed. Next, as shown in FIG. 23C, to this placed ultraviolet curing resin layer 31 and the stamper mold 29A, the intermediate board 19 is pressed by appropriate pressure force. By thus pressurizing between the stamper mold 29A and the intermediate board 19 by an appropriate pressure, it is possible to remove an extra ultraviolet curing resin between the stamper mold 29A and the intermediate board 19.

After the intermediate board 19 is pressed for a specified time period, the ultraviolet curing resin layer 31 molded in a desired shape is irradiated with the ultraviolet ray 32 from one side in the thickness direction of the intermediate board 19. As a result, the ultraviolet curing resin layer 31 is cured, and the first lens 36 is produced. This ultraviolet curing resin used here has a high refraction index. In this embodiment, an ultraviolet curing resin whose refraction index is, for example, approximately 1.59 is used.

Figure 23D:
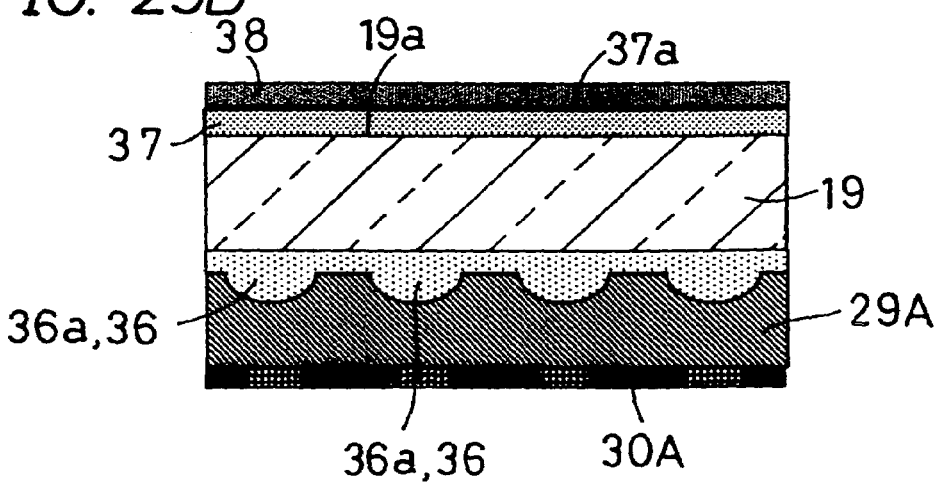

After that, as shown in FIG. 23D, in a state where the positional relation between the stamper mold 29A and the intermediate board 19 is held, an ultraviolet curing resin is applied to the one surface portion 19a of the intermediate board 19. The one surface portion 19a is the one surface portion 19a on the rear side of one surface of the intermediate board 19 that faces the first lens 36. As the ultraviolet curing resin, one having a high refraction index is used. In this embodiment, for example, one having a refraction index of 1.59 like the ultraviolet curing resin used at the time of producing the first lens 36 is used. At the time of applying the ultraviolet curing resin to the one surface portion 19a of the intermediate board 19, there is a need to properly define the number and the position of resin discharging openings of a not-shown applying device and the amount of the resin so that an ultraviolet curing resin layer 37 is applied to the one surface portion 19a substantially uniformly and of required thickness or more. In other words, by making the number and the position of the resin discharging openings and the amount of the resin proper, it becomes possible to apply the ultraviolet curing resin layer 37 substantially uniformly and in required thickness or more to the one surface portion 19a of the intermediate board 19.

Next, to one surface portion 37a of the applied ultraviolet curing resin layer 37, a negative resist 38 is applied. After that, as shown in FIG. 24A, from one side in the thickness direction of a mask member 30A, the mask member is irradiated with parallel ultraviolet rays 39. Regarding the ultraviolet rays 39 transmitted by the mask member 30A, a light amount distribution is made by this mask member 30A. Furthermore, by setting the refraction index of the stamper mold 29A to a higher value than the refraction index of the ultraviolet curing resin that forms the first lens 36, for example, to approximately 2.07, the ultraviolet light 39 transmitted by the first lens 36 is subjected to a lens effect at border portions 40 between respective spherical lenses 36a of the first lens 36 and the respective concave portions 29a. Therefore, the ultraviolet light of parallel light becomes a divergent light flux at the border portions 40.

By this divergent light flux, in the second ultraviolet curing resin layer 37, a light amount distribution which reflects the shape of a second lens 41 (refer to FIGS. 25A to 25C) is made. Since exposure thickness of the negative resist 38 changes in accordance with the light amount, it is possible to form a similar FIG. 42 of the second lens 41. On this occasion, transmittance of the mask member 30A has a transmittance distribution shown in FIG. 18 with respect to a direction of the line X—X of FIG. 14. Moreover, transmittance of the mask member 30A has a transmittance distribution shown in FIG. 19 with respect to a direction of the line Y—Y of FIG. 14. The second lens 41 formed by the mask member 30A having such transmittance distributions is formed into an aspheric shape as shown in FIG. 22.

By using such a second lens 41, it is possible to properly correct an aberration remaining in the first lens 36. Therefore, the efficiency of use of light increases, and it is possible to realize the microlens array 1A (refer to FIG. 5) having a good characteristic on which color mixture influences a little. In the method of manufacturing the microlens array 1A of this embodiment, the shape of the second lens 41 is not restricted. Because it is possible to form the second lens 41 into various shapes such as a trapezoidal shape, a cylindrical shape, a spherical shape and the aspheric shape, it is possible to select a lens shape that is more excellent in optical characteristic and highly reliable. The reason that, in this embodiment, the ultraviolet light 39 of parallel light is made to be a divergent light flux at the border portions 40 is that a projection face of the second lens 41 is larger than a projection face of the first lens 36 and there is a need to magnify and project the exposing ultraviolet light 39 transmitted by the first lens 36 onto the second lens forming face.

After that, as shown in FIG. 24B, the intermediate board 19 and the first lens 36 are released from the stamper mold 29A. Next, as shown in FIG. 24C, an unnecessary part of the negative resist 38 is removed, for example, by the use of a developer, and as shown in FIG. 25A, a negative resist forming face 38a is etched by dry etching. Consequently, it is possible to transfer a negative resist shape to the second ultraviolet curing resin layer 38. At the time of the dry etching, by raising a selection ratio of an etching speed of the second ultraviolet curing resin with respect to the negative resist 38, it is possible to form the exposure shape of the negative resist 38 into a shape magnified in the height direction, and it becomes possible to meet a thicker lens shape. Next, as shown in FIG. 25B, the protection board 17 is joined to one surface portion 36b of the first lens 36 via a planarizing layer 43.

The planarizing layer 43 is made of an ultraviolet curing resin which has a low refraction index, and in specific, the planarizing layer 43 used here has a refraction index of, for example, approximately 1.41. Therefore, the first lens 36 acts as a lens that has a positive refraction index. Furthermore, as shown in FIG. 25C, by applying and curing an ultraviolet curing resin onto one surface of the second lens 41, and thereafter, grinding and planarizing one surface of this ultraviolet curing resin, a low-refraction-index layer 44 is formed. This low-refraction-index layer 44 is also made of an ultraviolet curing resin that has a low refraction index like the planarizing layer 43. In specific, the low-refraction-index layer 44 used here has a refraction index of, for example, approximately 1.41. After that, to one surface of the low-refraction-index layer 44, the liquid crystal display element 13 is bonded via the black matrix 21.

Although an example of applying a microlens array of two-layer structure to a liquid crystal panel unit is shown in this embodiment, it is also possible to apply a microlens array of, for example, three or more layers to a liquid crystal panel unit as another embodiment of the invention. In this case, it is possible to prevent an aberration, and it is possible to remarkably increase an optical characteristic of a liquid crystal panel unit.

Instead of the stamper mold of this embodiment, it is also possible to produce a stamper mold in the following manner. In a first method, a stamper mold may be formed by, for example, applying resist to one surface of a light-transmitting board, executing electron beam exposure, forming a resist shape into a transfer shape of the first lens, and transferring the resist shape to the light-transmitting board by dry etching such as reactive ion etching (RIE). In this case, by forming resist for an electron beam and another resist in a multiple layer structure, and raising a selection ratio of the board with respect to the resist at the time of the dry etching, it is possible to produce a deeper lens shape.

In a second method, by the use of a transmittance distribution mask responsive to the first lens, resist applied to the one surface of the board may be exposed into a shape similar to the lens shape. After this exposure, by transferring the resist shape to the board by dry etching such as RIE, a stamper mold may be formed. A method of deforming resist exposed to a small piece corresponding to the first lens into a spherical shape or an aspheric shape by thermal sagging and then transferring a shape by etching (also referred to as a reflow method) can also be used. A method of forming a mask layer on which a small hole corresponding to the first lens is formed and processing into a spherical shape by wet etching can also be used. In the method of forming a spherical concave portion by wet etching, it is also possible, by changing a diameter of a small hole of a mask layer, to produce a lens that has an aspheric shape.

Although, after an ultraviolet curing resin is applied and cured on one surfaces of the intermediate board and the second lens, one surface of this ultraviolet curing resin is ground and planarized in this embodiment, a planarizing layer may be added on the one surfaces of the intermediate board and the second lens. Since grinding and planarizing can be omitted in this case, it is possible to further facilitate a method of manufacturing a microlens array. Moreover, the above embodiments may be partially changed in various ways in a range without deviating from the scope of the invention.

Although the second lens is exposed and cured after the first lens is exposed and cured in this embodiment, as far as the positional relation between the stamper mold and the first lens does not change, the first lens may be exposed and cured simultaneously with or after irradiation of ultraviolet rays for exposing or curing of the second lens, and in this case, it becomes possible to previously apply a photosensitive material for forming the second lens, and it is possible to facilitate the process.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A projection-type liquid crystal display apparatus comprising:
- a liquid crystal display element; and
- a microlens array including a first microlens array disposed to one end face in a thickness direction, and a second microlens array disposed to another end face in the thickness direction and formed into a cylindrical shape; and
- an opening portion formed between the liquid crystal display element and the microlens array.

2. The apparatus of claim 1, further comprising:
- a light source; and
- light flux separating means for separating a white light flux from the light source into a plurality of light fluxes,
- wherein the liquid crystal display element transmits the plural light fluxes separated by the light flux separating means, and selectively changes intensity distributions of these light fluxes.

* * * * *